(12) United States Patent
Someya

(10) Patent No.: US 10,565,833 B2
(45) Date of Patent: Feb. 18, 2020

(54) TERMINAL APPARATUS AND CONTROL METHOD OF TERMINAL APPARATUS

(71) Applicant: SEIKO EPSON CORPORATION, Tokyo (JP)

(72) Inventor: Tomohito Someya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/885,397

(22) Filed: Jan. 31, 2018

(65) Prior Publication Data

US 2018/0233002 A1    Aug. 16, 2018

(30) Foreign Application Priority Data

Feb. 10, 2017  (JP) ................................. 2017-023172
Feb. 10, 2017  (JP) ................................. 2017-023173

(51) Int. Cl.

| G07G 1/12 | (2006.01) |
|---|---|
| H04N 1/00 | (2006.01) |
| G06Q 20/20 | (2012.01) |
| G07G 1/00 | (2006.01) |
| G06K 15/02 | (2006.01) |

(52) U.S. Cl.
CPC ............... *G07G 1/12* (2013.01); *G06Q 20/20* (2013.01); *G07G 1/0009* (2013.01); *H04N 1/00307* (2013.01); *H04N 1/00315* (2013.01); *H04N 1/00973* (2013.01); *G06K 15/1806* (2013.01); *H04N 2201/0082* (2013.01)

(58) Field of Classification Search
CPC ...... G07G 1/12; G06K 15/1806; G06Q 20/20; H04N 1/00307; H04N 1/00973; H04N 2201/0082; H04M 1/00315
See application file for complete search history.

(56) References Cited

U.S. PATENT DOCUMENTS

| 9,720,414 B1* | 8/2017 | Theobald ............... G06Q 50/14 |
|---|---|---|
| 10,304,043 B1* | 5/2019 | Nguyen ............... G06Q 20/204 |
| 2005/0283403 A1* | 12/2005 | Ramirez ............... G06Q 20/20 705/16 |
| 2015/0295997 A1* | 10/2015 | Takasu .................... G07G 1/12 709/203 |
| 2016/0042337 A1 | 2/2016 | Ota et al. |
| 2016/0063477 A1* | 3/2016 | Egan .................... G06Q 20/327 455/406 |
| 2017/0039547 A1* | 2/2017 | Bonsi ................ G06Q 20/3278 |
| 2017/0055292 A1* | 2/2017 | Sato ....................... H04W 72/08 |

(Continued)

FOREIGN PATENT DOCUMENTS

| JP | H1011657 | * | 1/1998 |
|---|---|---|---|
| JP | 2009-163686 | | 7/2009 |

(Continued)

*Primary Examiner* — Thien M Le
*Assistant Examiner* — Asifa Habib
(74) *Attorney, Agent, or Firm* — Workman Nydegger

(57) ABSTRACT

A tablet terminal includes a detection unit that detects a distance to a printing apparatus, a tablet terminal radio communication unit that transmits a command indicating control of the printing apparatus, and a processing unit that suppresses transmission of a command to be transmitted by the tablet terminal radio communication unit when the distance to the printing apparatus detected by the detection unit is greater than or equal to a predetermined value.

7 Claims, 7 Drawing Sheets

(56) References Cited

U.S. PATENT DOCUMENTS

| | | | |
|---|---|---|---|
| 2017/0097797 A1* | 4/2017 | Yasuno | G06F 3/1222 |
| 2017/0185924 A1* | 6/2017 | Kaneko | G06Q 10/02 |
| 2018/0152589 A1* | 5/2018 | Matsuda | H04N 1/32112 |

FOREIGN PATENT DOCUMENTS

| | | |
|---|---|---|
| JP | 2016-024606 | 2/2016 |
| JP | 2016-048537 | 4/2016 |

* cited by examiner

TERMINAL APPARATUS AND CONTROL METHOD OF TERMINAL APPARATUS

BACKGROUND

1. Technical Field

The present invention relates to a terminal apparatus and a control method of a terminal apparatus.

2. Related Art

A technique has been known where a terminal apparatus such as a tablet terminal transmits a signal to an external apparatus located at a position away from the terminal apparatus and the external apparatus (for example, a control apparatus such as a printer) executes a command received from the terminal apparatus located at a position away from the control apparatus (for example, see JP-A-2016-48537). In a control system of a restaurant described in JP-A-2016-48537, when control data indicating a shift to an open state of a cash drawer is transmitted to a mobile printer from a tablet terminal used by a person in charge of a hall, an open instruction signal is transmitted from a cradle, to which the mobile printer is attached, to the cash drawer connected to the cradle. The cash drawer shifts to the open state according to the open instruction signal.

In a configuration described in JP-A-2016-48537, a plurality of persons in charge of the hall share the cash drawer. However, for example, when the number of persons in charge of the hall is small, there may be a situation where it is not appropriate to open a cash drawer located at a position away from a person in charge of the hall. In this way, while a configuration where commands are transmitted and received between apparatuses away from each other has high convenience, it may not necessarily be appropriate to execute a command depending on a distance between the apparatuses. Therefore, it is desired to appropriately control execution of commands.

SUMMARY

An advantage of some aspects of the invention is to be able to appropriately execute commands according to a distance between apparatuses in a configuration where commands are transmitted and received between the apparatuses away from each other.

Application Example 1

To achieve the above advantage, a terminal apparatus of the present application example includes a detection unit that detects a distance to an external apparatus, a transmitting unit that transmits a command indicating control of the external apparatus, and a control unit that suppresses transmission of the command to be transmitted by the transmitting unit when the distance to the external apparatus detected by the detection unit is greater than or equal to a predetermined value.

According to the present application example, it is possible to suppress transmission of a command from the terminal apparatus to the external apparatus when the distance between the terminal apparatus and the external apparatus is greater than or equal to the predetermined value. Thereby, in a state where the distance between the terminal apparatus and the external apparatus is greater than or equal to the predetermined value, it is possible to limit execution of a command to be executed by the external apparatus and cause the external apparatus to appropriately execute the command.

Application Example 2

In the above configuration, the terminal apparatus may have a configuration in which a display unit is further included and when the distance to the external apparatus detected by the detection unit is greater than or equal to the predetermined value, the control unit displays that the distance to the external apparatus is greater than or equal to the predetermined value.

According to this configuration, it is possible to notify a user who uses the terminal apparatus that the distance from the external apparatus is greater than or equal to the predetermined value by displaying information indicating that the terminal apparatus and the external apparatus are away from each other.

Application Example 3

In the above configuration, the terminal apparatus may have a configuration in which the control unit causes the display unit to display a transmission instruction image that causes the transmitting unit to transmit the command according to an operation and displays the transmission instruction image in an inoperable manner when the distance to the external apparatus detected by the detection unit is greater than or equal to the predetermined value.

According to this configuration, in a configuration where a command is transmitted to the external apparatus according to an operation of the terminal apparatus, it is possible to disable an operation for transmitting a command, and further it is possible to notify a user that the operation is disabled through a display. Therefore, when the distance between the terminal apparatus and the external apparatus is greater than or equal to the predetermined value, it is possible to suppress or prevent an operation which is related to transmission of a command and is performed by a user who operates the tablet apparatus and it is possible to optimize execution of a command.

Application Example 4

In the above configuration, the terminal apparatus may have a configuration in which a data receiving unit that receives data from the external apparatus is further included and the control unit does not perform processing based on the data received by the data receiving unit when the distance to the external apparatus detected by the detection unit is greater than or equal to the predetermined value.

According to this configuration, in a state in which the distance between the terminal apparatus and the external apparatus is greater than or equal to the predetermined value, the terminal apparatus can suppress progress of data processing between the external apparatus and the terminal apparatus and optimize the data processing.

Application Example 5

In the above configuration, the terminal apparatus may have a configuration in which the external apparatus can be connected to a cash drawer and the command is a command indicating control of the cash drawer.

According to this configuration, in a configuration where the cash drawer is connected to the external apparatus, when the external apparatus controls the cash drawer on the basis of a command received from the terminal apparatus, it is possible to optimize the control of the cash drawer by suppressing transmission of the command.

Application Example 6

In the above configuration, the terminal apparatus may have a configuration in which a state determination unit that determines an open/closed state of the cash drawer and a notification unit are further included, and when the cash drawer is determined to be in an open state by the state determination unit and a distance to the cash drawer detected by the detection unit is greater than or equal to a predetermined value, the notification unit notifies that the cash drawer is in an open state.

According to this configuration, when the terminal apparatus and the cash drawer are away from each other and the cash drawer is in the open state, the notification unit can notify that the cash drawer is in the open state.

Application Example 7

In the above configuration, the terminal apparatus may have a configuration in which the external apparatus can be connected to a reading apparatus that reads data from an IC card and the command is a command indicating control of the reading apparatus.

According to this configuration, in a configuration where the reading apparatus is connected to the external apparatus, when the external apparatus controls the reading apparatus on the basis of a command received from the terminal apparatus, it is possible to optimize the control of the reading apparatus that reads data from an IC card by suppressing transmission of the command.

Application Example 8

To achieve the above advantage, a terminal apparatus of the present application example includes a beacon receiving unit that receives a beacon signal, a transmitting unit that transmits a command indicating control of an external apparatus, and a control unit that suppresses transmission of the command to be transmitted by the transmitting unit on the basis of intensity of the beacon signal received by the beacon receiving unit.

According to the present application example, it is possible to suppress transmission of a command from the terminal apparatus to the external apparatus on the basis of the intensity of the beacon signal received by the terminal apparatus through the beacon receiving unit. For example, when the intensity of the beacon signal received by the terminal apparatus is smaller than or equal to a predetermined value, it is possible to suppress transmission of a command from the terminal apparatus to the external apparatus. In this case, it is possible to suppress transmission of a command in a situation where the reception intensity of the beacon signal decreases, such as a case where the terminal apparatus is far away from a transmission source of the beacon signal. In this way, the transmission of a command is suppressed on the basis of the intensity of the beacon signal, which reflects effects of the position and an installation environment of the terminal apparatus, and thereby it is possible to optimize the transmission of a command from the terminal apparatus to the external apparatus and cause the external apparatus to appropriately execute the command.

Application Example 9

To achieve the above advantage, a control method of a terminal apparatus of the present application example is a control method of a terminal apparatus that transmits a command indicating control of an external apparatus. The control method detects a distance to the external apparatus, and when the detected distance to the external apparatus is greater than or equal to a predetermined value, the control method suppresses transmission of the command.

According to the present application example, it is possible to suppress transmission of a command from the terminal apparatus to the external apparatus when the terminal apparatus and the external apparatus are away from each other. Thereby, in a state where the terminal apparatus and the external apparatus are away from each other, it is possible to limit execution of a command to be executed by the external apparatus and cause the external apparatus to appropriately execute a command.

Application Example 10

To achieve the above advantage, a control apparatus of the present application example includes a detection unit that detects a distance to a terminal apparatus and a control unit that executes processing on the basis of a command received from the terminal apparatus. The control unit limits execution of the processing based on the received command when the distance to the terminal apparatus detected by the detection unit is greater than or equal to a predetermined value.

According to the present application example, when a distance between the control apparatus and the terminal apparatus is greater than or equal to a predetermined value, the control apparatus can limit execution of a command received from the terminal apparatus. Thereby, it is possible to cause the control apparatus to execute a command appropriately.

Application Example 11

In a configuration described in the above application example 10, the control apparatus may have a configuration in which a notification unit is further included and the notification unit notifies that the execution of processing based on the received command is limited when the distance to the terminal apparatus detected by the detection unit is greater than or equal to the predetermined value.

According to this configuration, the control apparatus causes the notification unit to notify that the distance between the control apparatus and the terminal apparatus is greater than or equal to the predetermined value, so that the control apparatus can let a user who uses the terminal apparatus to know that the terminal apparatus is far away from the control apparatus.

Application Example 12

In the configuration described in the above application example 10 or 11, the control apparatus may have a configuration in which when the distance to the terminal apparatus detected by the detection unit is greater than or equal to the predetermined value, the control unit transmits data indicating that the execution of processing based on the received command is limited to the terminal apparatus.

According to this configuration, when the distance between the control apparatus and the terminal apparatus is greater than or equal to the predetermined value, data indicating that the control apparatus limits the execution of processing based on the command is transmitted to the terminal apparatus. Thereby, the terminal apparatus that transmits the command can detect that the control apparatus limits the execution of processing based on the command. Therefore, it is possible to notify the user who uses the terminal apparatus that the execution of processing based on the command is limited.

Application Example 13

In a configuration described in any one of the above application examples 10 to 12, the control apparatus may have a configuration in which the control unit can perform processing according to a type of the command and the control unit does not perform processing based on preset types of the commands when the distance to the terminal apparatus detected by the detection unit is greater than or equal to the predetermined value.

According to this configuration, when the distance between the terminal apparatus and the control apparatus is greater than or equal to the predetermined value, the control apparatus does not perform processing based on the preset types of commands among the commands that can be executed by the control apparatus. Therefore, the control apparatus can appropriately execute commands according to the types of commands.

Application Example 14

In a configuration described in any one of the above application examples 10 to 12, the control apparatus may have a configuration in which the control apparatus can be connected to an external apparatus, and when the distance to the terminal apparatus detected by the detection unit is greater than or equal to the predetermined value, the control unit does not perform processing based on a command indicating control of the external apparatus.

According to this configuration, in a configuration where an external apparatus is connected to the control apparatus, when the control apparatus controls the external apparatus on the basis of a command received from the terminal apparatus, if the distance between the terminal apparatus and the control apparatus is greater than or equal to the predetermined value, the control apparatus does not perform processing based on the command. Therefore, the control apparatus can control the external apparatus more appropriately.

Application Example 15

In the configuration described in the above application example 14, the control apparatus may have a configuration in which the external apparatus is a cash drawer and the command is a command indicating unlock of the cash drawer.

According to this configuration, when the cash drawer is connected to the control apparatus, if the distance between the terminal apparatus and the control apparatus is greater than or equal to the predetermined value, the control apparatus does not perform processing based on the command indicating unlock of the cash drawer. Thereby, it is possible to appropriately control an operation to unlock the cash drawer that stores cash.

Application Example 16

In the configuration described in the above application example 14, the control apparatus may have a configuration in which the external apparatus is a reading apparatus that reads data from an IC card and the command is a command instructing the reading apparatus to start up.

According to this configuration, when the control apparatus is connected to the IC card reader and the distance between the terminal apparatus and the control apparatus is greater than or equal to the predetermined value, the control apparatus does not perform processing based on a command instructing the IC card reader to start up. Thereby, it is possible to appropriately control an operation to start up the IC card reader.

Application Example 17

To achieve the above advantage, a control apparatus of the present application example includes a receiving unit that receives a beacon signal from a terminal apparatus and a control unit that performs processing on the basis of a command received from the terminal apparatus, and the control unit limits execution of processing based on the received command when the intensity of the beacon signal received by the receiving unit is smaller than or equal to a predetermined value.

According to the present application example, it is possible to limit execution of a command received from the terminal apparatus on the basis of the intensity of the beacon signal received by the control apparatus through the receiving unit. Thereby, it is possible to suppress execution of a command in a situation where the reception intensity of the beacon signal decreases, such as a case where the terminal apparatus, which is a transmission source of the beacon signal, is far away from the control apparatus. In this way, the execution of a command is suppressed on the basis of the intensity of the beacon signal, which reflects effects of the position and an installation environment of the terminal apparatus, and thereby it is possible to optimize the execution of a command executed by the control apparatus.

Application Example 18

To achieve the above advantage, a control method of a control apparatus of the present application example is a control method of a control apparatus that performs processing on the basis of a command received from a terminal apparatus. The control method detects a distance to the terminal apparatus, and when the detected distance to the terminal apparatus is greater than or equal to a predetermined value, the control method limits execution of processing based on the received command.

According to the present application example, when a distance between the control apparatus and the terminal apparatus is greater than or equal to a predetermined value, the control apparatus can limit execution of a command received from the terminal apparatus. Thereby, it is possible to cause the control apparatus to execute a command appropriately.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.

Figure 1:
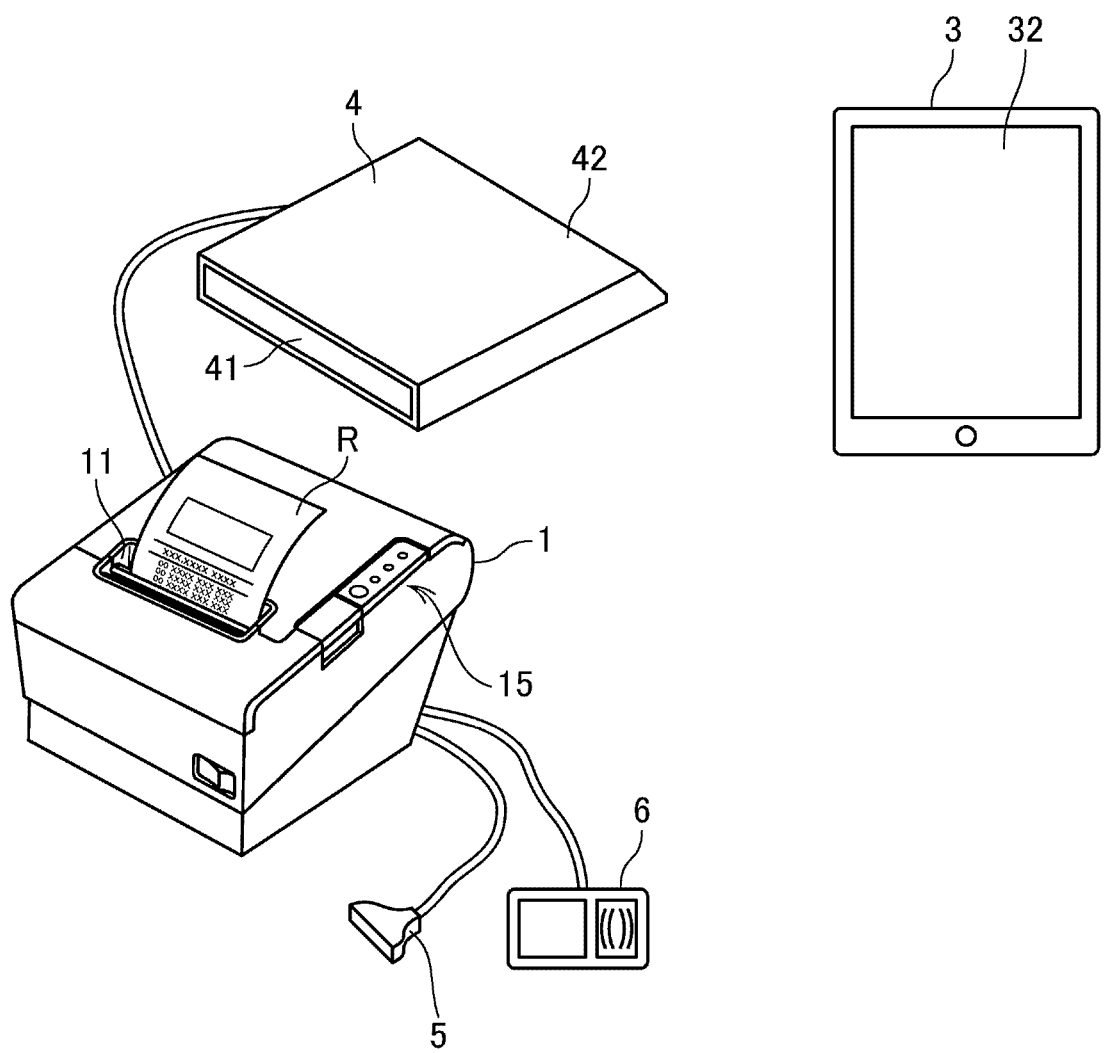
FIG. 1 is an outline diagram showing a configuration of a POS system according to an embodiment of the invention.

FIG. 1 is an outline diagram showing a configuration of a POS system 100.

The POS system 100 performs accounting processing and processing to issue a receipt R at stores such as retail stores like supermarkets and convenience stores, stores such as restaurants like pubs and cafes, and the like.

As shown in FIG. 1, the POS system 100 includes a tablet terminal 3 and a printing apparatus 1. The tablet terminal 3 performs accounting processing according to accounting. The printing apparatus 1 is connected to the tablet terminal 3 through radio communication (wireless communication) and issues a receipt R by being controlled by the tablet terminal 3.

As shown in FIG. 1, the printing apparatus 1 is connected with a cash drawer 4 that stores cash, a barcode scanner 5 that reads a barcode attached to a commodity or a package of a commodity, and an IC card reader 6 that reads information from an IC (Integrated Circuit) card. The POS system 100 may have a configuration including the cash drawer 4, the barcode scanner 5, and the IC card reader 6.

When issuing the receipt R, the tablet terminal 3 generates a command indicating execution of various processing related to issuing the receipt R and transmits the command to the printing apparatus 1. The printing apparatus 1 issues the receipt R on the basis of the command received from the tablet terminal 3.

The cash drawer 4 includes a tray 41 that houses cash and the like and a housing 42 that houses the tray 41. The tray 41 is openably/closably attached to the housing 42. The tray 41 protrudes from the housing 42 in an open state, so that the cash and the like can be carried in and out. The tray 41 is stored in the housing 42 in a closed state, so that the cash and the like cannot be carried in and out. The tray 41 is opened by control of the printing apparatus 1 as described later.

The IC card reader 6 is an apparatus that reads and/or writes data from and to a contact-type or non-contact-type IC card. The IC card reader 6 reads data from an IC card for performing settlement, such as, for example, a credit card, a debit card, a cash card of a financial institution, and so-called electronic money. Further, the IC card reader 6 can be used to read an IC card, which is used for usage other than settlement, such as a membership card and a point card.

The printing apparatus 1 is installed, for example, on a checkout counter in the various stores described above. The cash drawer 4, the barcode scanner 5, and the IC card reader 6, which are connected to the printing apparatus 1, are installed on the checkout counter or in the vicinity of the checkout counter along with the printing apparatus 1.

On the other hand, the tablet terminal 3 is an apparatus that is held by hands of a checkout operator (user) and used by the user, and the user can carry the tablet terminal 3. Therefore, there is a lot of flexibility in position of the tablet terminal 3, so that the user can select how to use the tablet terminal 3 according to a store. For example, the user may install the tablet terminal 3 on the checkout counter to use the tablet terminal 3. Alternatively, for example, the user may carry around the tablet terminal 3 in the store, and the user may move to the checkout counter to perform accounting processing.

The printing apparatus 1 is a line thermal printer. The printing apparatus 1 stores a roll paper inside thereof and outputs the receipt R by forming dots and printing an image on the roll paper by using a line type thermal head. The printing apparatus 1 has a discharge port 11 from which the receipt R is discharged.

The printing apparatus 1 has an LED display unit 15. The LED display unit 15 includes a plurality of LEDs (not shown in the drawings) and displays information related to the printing apparatus 1, such as an operation mode and a processing state of the printing apparatus 1, by turning on/off the LEDs in a predetermined form. A display light source included in the printing apparatus 1 is not limited to the LED display unit 15, but may be a lamp, an organic EL (Electro Luminescence) element, or another light source.

The tablet terminal 3 has a touch panel 32. The touch panel 32 has a display panel such as a liquid crystal display panel or an organic EL panel, and a touch sensor that is provided so as to overlap the display panel and detects a touch operation of the user. The touch panel 32 is provided at a position which the user can visually recognize and where the user can perform a touch operation. In the example of FIG. 1, the touch panel 32 is arranged on the surface of the tablet terminal 3.

As described above, the printing apparatus 1 is stationarily installed on a checkout counter or the like. On the other hand, the tablet terminal 3 can be carried by a user. Therefore, when the user moves while carrying the tablet terminal 3, a distance between the printing apparatus 1 and the tablet terminal 3 changes. In other words, in the POS system 100, the distance between the printing apparatus 1 and the tablet terminal 3 is not constant.

In the POS system 100, the tablet terminal 3 detects the distance between the printing apparatus 1 and the tablet terminal 3. As a specific configuration for the tablet terminal 3 to detect the distance between the printing apparatus 1 and the tablet terminal 3, the POS system 100 of the present embodiment transmits (sends) a beacon signal from the printing apparatus 1 to the tablet terminal 3. Examples of the beacon signal transmitted from the printing apparatus 1 include a radio beacon that uses a wireless radio wave of 2.5 GHz band and an optical beacon that uses infrared light (IR). However, in the present embodiment, a beacon signal of a wireless radio wave is used.

The beacon signal transmitted from the printing apparatus 1 attenuates until the beacon signal is received by the tablet terminal 3, and the intensity of the received beacon signal when the tablet terminal 3 receives the beacon signal roughly reflects the distance between the printing apparatus 1 and the tablet terminal 3. Therefore, it is possible to estimate, calculate, or approximate the distance between the printing apparatus 1 and the tablet terminal 3 on the basis of the intensity of the beacon signal received by the tablet terminal 3. The processing of estimating or calculating the distance or an approximate distance between the printing apparatus 1 and the tablet terminal 3 is called detecting the distance.

Figure 2:
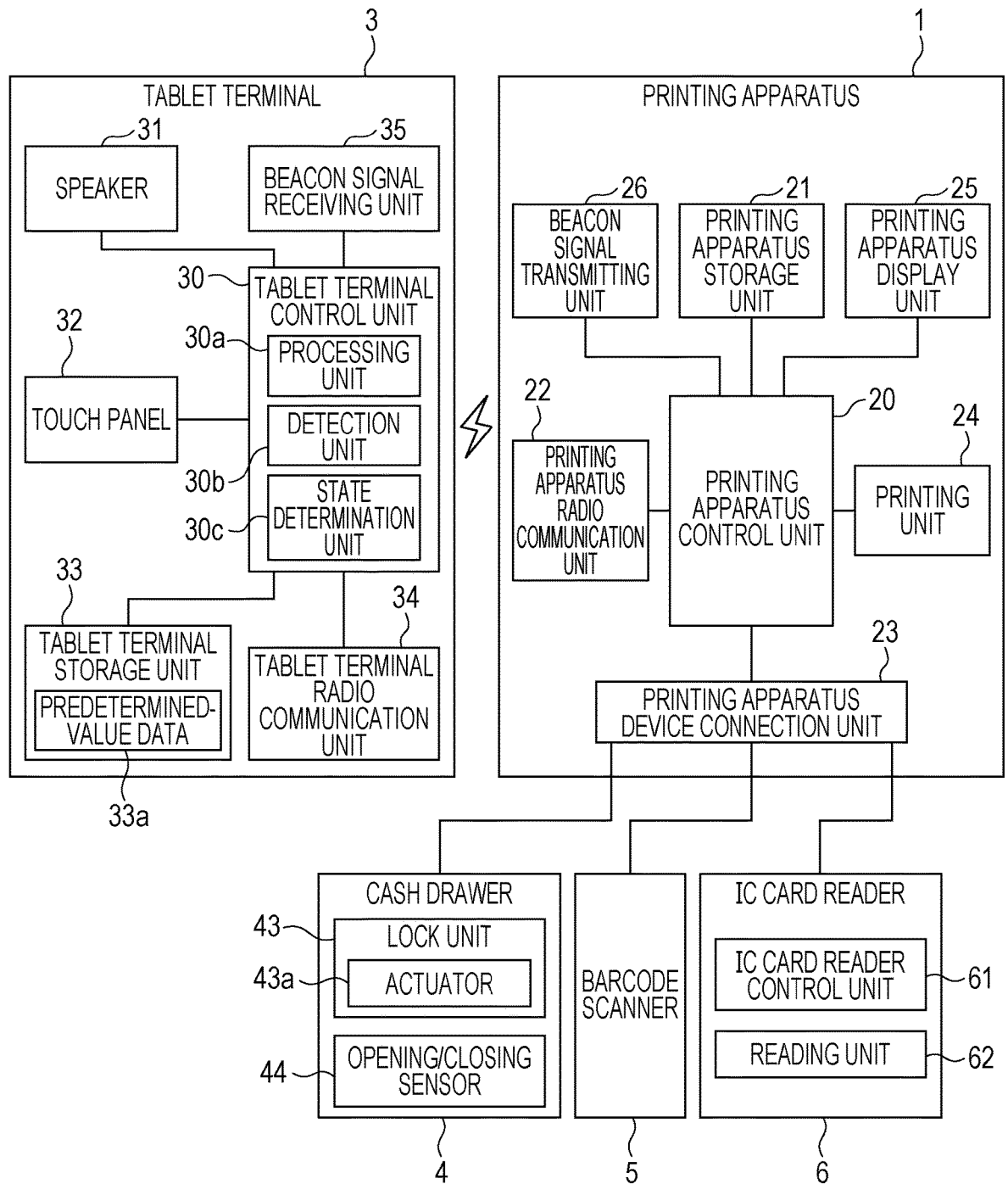
FIG. 2 is a block diagram showing a functional configuration of each apparatus included in the POS system.

FIG. 2 is a block diagram showing a functional configuration of each apparatus included in the POS system 100 and shows functional blocks of the printing apparatus 1 and the tablet terminal 3. The tablet terminal 3 corresponds to a terminal apparatus.

The tablet terminal 3 includes a tablet terminal control unit 30, a speaker 31, a tablet terminal storage unit 33, a tablet terminal radio communication unit 34 (tablet terminal wireless communication unit), a beacon signal receiving unit 35, and a touch panel 32.

The tablet terminal control unit 30 includes hardware such as a CPU (Central Processing Unit), a ROM (Read Only Memory), and a RAM (Random Access Memory) (which are not shown in the drawings). The CPU executes a predetermined control program, and thereby the tablet terminal control unit 30 controls each unit of the tablet terminal 3. The ROM is a non-volatile storage apparatus. The ROM stores the control program to be executed by the CPU and data to be processed by the control program. The RAM forms a work area of the CPU. The CPU allocates the control program read from the ROM or the tablet terminal storage unit 33 in the RAM and executes the allocated control program to control each unit of the tablet terminal 3. The tablet terminal control unit 30 includes a processing unit 30*a*, a detection unit 30*b*, and a state determination unit 30*c*. The processing unit 30*a* corresponds to a control unit. The processing unit 30*a*, the detection unit 30*b*, and the state determination unit 30*c* are functional units that are realized by cooperation of hardware and software when the CPU of the tablet terminal control unit 30 executes a program.

An audio signal is inputted into the speaker 31 from the tablet terminal control unit 30 or an audio signal output circuit (not shown in the drawings) connected to the tablet terminal control unit 30. The speaker 31 outputs voice based on the inputted audio signal. The speaker 31 corresponds to a notification unit.

The tablet terminal storage unit 33 stores programs and data in a non-volatile manner. The tablet terminal storage unit 33 includes a semiconductor memory element, a magnetic storage apparatus, and the like and stores a program executed by the CPU of the tablet terminal control unit 30 and various data. The tablet terminal storage unit 33 of the present embodiment stores predetermined-value data 33*a*. The predetermined-value data 33*a* includes data of "predetermined-value" which is a threshold value for the tablet terminal control unit 30 to determine the distance between the printing apparatus 1 and the tablet terminal 3.

The tablet terminal radio communication unit 34 transmits and receives control commands and various data to and from the printing apparatus 1 according to a predetermined radio communication standard by control of the tablet terminal control unit 30. As a communication method of the radio communication performed between the tablet terminal 3 and the printing apparatus 1, for example, a method complying with standard of WiFi (registered trademark) or Bluetooth (registered trademark) can be used. However, another communication method can also be used. The tablet terminal radio communication unit 34 corresponds to a transmitting unit and a data receiving unit.

The beacon signal receiving unit 35 receives a beacon signal that is a radio signal of a predetermined frequency and outputs a control signal indicating that the beacon signal is received to the tablet terminal control unit 30. The control signal outputted by the beacon signal receiving unit 35 includes information indicating a reception signal intensity when the beacon signal receiving unit 35 receives the beacon signal. The beacon signal receiving unit 35 corresponds to a beacon receiving unit.

The beacon signal receiving unit 35 has a configuration suitable to receive the beacon signal transmitted by the printing apparatus 1. However, the beacon signal receiving unit 35 may receive signals other than the beacon signal transmitted by the printing apparatus 1. For example, the beacon signal transmitted by the printing apparatus 1 may include an identification code, and the beacon signal receiving unit 35 may identify a transmission source by the identification code included in the received beacon signal. In this case, it is possible to realize a configuration where the beacon signal receiving unit 35 receives only a beacon signal transmitted by a specific transmission source (for example, the printing apparatus 1).

The detection unit 30*b* detects the distance between the printing apparatus 1 and the tablet terminal 3. As described above, a plurality of methods for detecting the distance between the printing apparatus 1 and the tablet terminal 3 are considered. However, in the present embodiment, the detection unit 30*b* obtains the distance between the printing apparatus 1 and the tablet terminal 3 based on the reception signal intensity when the beacon signal is received by the beacon signal receiving unit 35. The distance calculated by the detection unit 30*b* need not necessarily be an accurate distance between the printing apparatus 1 and the tablet terminal 3 as described above, and may be, for example, an approximate distance or a value that indicates the distance between the printing apparatus 1 and the tablet terminal 3 in a stepwise manner. For example, the detection unit 30*b* may obtain the distance from the reception signal intensity of the beacon signal receiving unit 35 by arithmetic processing using an arithmetic equation. Further, the detection unit 30*b* may convert (change) the reception signal intensity of the beacon signal receiving unit 35 into an approximate distance by using a table that associates the reception signal intensity of the beacon signal receiving unit 35 with a distance. Alternatively, the detection unit 30*b* may determine the reception signal intensity of the beacon signal receiving unit 35 in a stepwise manner based on a plurality of reference values that have been set in advance and obtain a distance that is set corresponding to a determined step as an approximate distance between the printing apparatus 1 and the tablet terminal 3. The arithmetic equation, the table, the reference values, and the other setting values may be, for example, set in advance and stored in the tablet terminal storage unit 33.

The detection unit 30*b* outputs the calculated distance (that may be the approximate distance) to the processing unit 30*a*.

Further, the detection unit 30*b* may identify positions of the printing apparatus 1 and the tablet terminal 3 by analyzing captured image data obtained by capturing images of an environment (a store and the like) where the POS system 100 is installed, and detect the distance between the printing apparatus 1 and the tablet terminal 3. For example, each of the printing apparatus 1 and the tablet terminal 3 may include a position detection means (not shown in the drawings) that detects a position in an environment where the POS system 100 is installed. In this case, the printing apparatus 1 may transmits data indicating a detected position to the tablet terminal 3 by using a printing apparatus radio communication unit 22 (printing apparatus wireless communication unit), and the tablet terminal 3 may receive the data by using the tablet terminal radio communication unit 34. In this configuration, the detection unit 30*b* can identify a position of the printing apparatus 1 on the basis of the data received by the tablet terminal radio communication unit 34 and obtain the distance between the printing apparatus 1 and the tablet terminal 3. The invention can be applied to any of these configurations and the other configurations.

The touch panel 32 functions as a display unit and displays various information on the display panel according to control of the tablet terminal control unit 30. An accounting user interface 70 will be described later as an example of the information displayed on the touch panel 32.

The touch panel 32 detects a touch operation by a hand or a finger of a user or another indication body and outputs a signal indicating a position where the touch operation is performed to the tablet terminal control unit 30. The tablet terminal control unit 30 detects that a touch operation is performed to the touch panel 32 on the basis of an input from the touch panel 32 and acquires an operation position.

When the tablet terminal control unit 30 detects an operation to the touch panel 32, the tablet terminal control unit 30 can identify content of the touch operation on the basis of the operation position and display content of the touch panel 32. Specifically, the tablet terminal control unit 30 can identify a display object displayed at a position corresponding to the operation position of the touch panel 32 and obtain a function associated with the identified display object as a function indicated by the touch operation.

Figure 3:
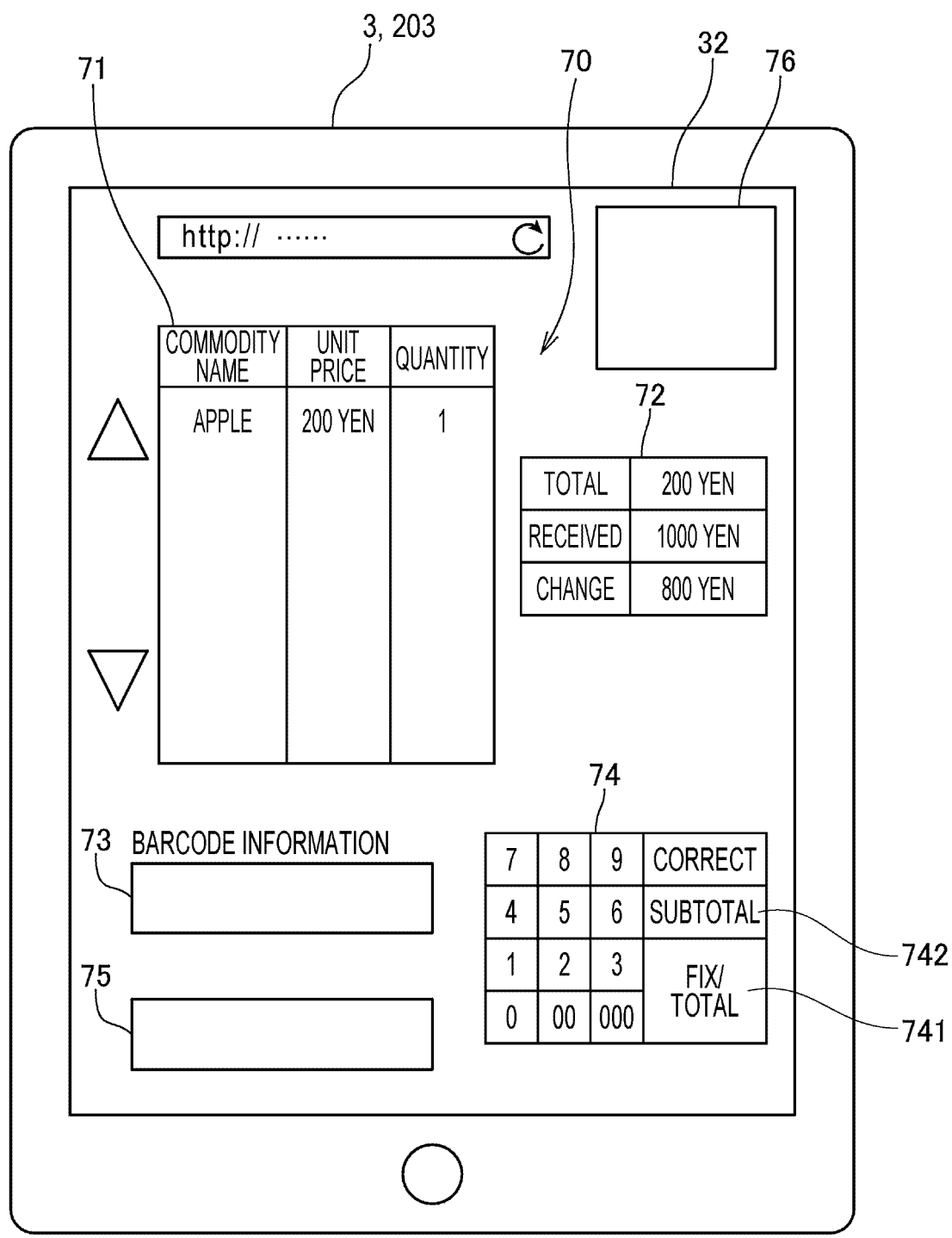
FIG. 3 is a schematic diagram showing a display example of a tablet terminal included in the POS system.

FIG. 3 is a schematic diagram showing a display example of the tablet terminal included in the POS system. FIG. 3 shows and explains an example of the accounting user interface 70 displayed on the touch panel 32 according to the present embodiment.

A list display area 71 is provided in an upper left portion of the accounting user interface 70 illustrated in FIG. 3. In the list display area 71, commodity names of commodities purchased by a customer, unit prices of the commodities, and quantities of the commodities are displayed as a list.

A price display area 72 is provided on the right side of the list display area 71. The price display area 72 displays a total price of the commodities purchased by the customer, the amount of money handed from the customer during payment, and the change sum to be handed to the customer.

A barcode information display area 73 is provided below the list display area 71. The barcode information display area 73 displays information of a barcode read by the barcode scanner 5 (hereinafter referred to as "barcode information"). The information of a barcode read by the POS system 100 is, for example, a commodity code assigned to a commodity.

A software numeric keypad 74 is provided on the right side of the barcode information display area 73. The software numeric keypad 74 has a fix key 741 that fixes the payment and a Subtotal key 742 that indicates a subtotal (calculation of total price of commodities purchased by the customer). On the touch panel 32, when a numeric key of the software numeric keypad 74 is touched, the tablet terminal control unit 30 detects an input of a numeral. Similarly, when a display position of the Fix key 741 or the Subtotal key 742 is touched, the tablet terminal control unit 30 detects an input of an instruction for fixing the payment or an input of an instruction of the subtotal.

A message section 75 is provided below the barcode information display area 73. A message for the user is displayed in the message section 75.

For example, a message "located far from the printing apparatus" can be displayed in the message section 75. When the above message is displayed in the message section 75, it is possible to notify the user of the tablet terminal 3 that the distance between the tablet terminal 3 and the printing apparatus 1 is large. Further, by the message displayed in the message section 75, for example, it is possible to urge the user who uses the tablet terminal 3 to approach the printing apparatus 1 and guide the user to visually check the state of the printing apparatus 1.

A transmission instruction image 76 is provided above the price display area 72. The transmission instruction image 76 is an image for the user to perform an operation to instruct the tablet terminal 3 to transmit a command. On the touch panel 32, when a touch operation is performed at a position corresponding to the transmission instruction image 76, the tablet terminal control unit 30 detects an input of an instruction of command transmission. The tablet terminal control unit 30 generates a command according to the detected input and causes the tablet terminal radio communication unit 34 to transmit the command to the printing apparatus 1.

The command transmitted by the tablet terminal 3 according to an operation of the transmission instruction image 76 is an open command or an IC card reader control command. The open command and the IC card reader control command are control commands predefined in the POS system 100. When an operation of the transmission instruction image 76 is performed, the tablet terminal 3 transmits an open command or an IC card reader control command according to whether an object to be controlled is the cash drawer 4 or the IC card reader 6.

The open command is a command to cause the printing apparatus 1 to perform an operation to cause the cash drawer 4 to be in an open state.

The IC card reader control command is a command that instructs the printing apparatus 1 to control an operating state of the IC card reader 6 to be active. The IC card reader control command corresponds to a command that instructs the IC card reader 6, which is a reading apparatus, to start up.

While the tablet terminal 3 displays the accounting user interface 70 on the touch panel 32, a user can perform accounting processing in the store described above. The user performs a touch operation on the touch panel 32 according to a request of a customer who purchases commodities and the like, and performs input related to accounting. For example, the user inputs quantities of the commodities, the amount of money, an instruction of subtotal, the amount of money handed from the customer, an instruction of fixing, and the like.

The tablet terminal 3 performs accounting processing based on the input from the user and displays a total price, change, and the like on the accounting user interface 70. When the accounting processing is completed, the tablet terminal 3 controls the printing apparatus 1 to issue a receipt R on which information related to the accounting is printed. The receipt R issued by the printing apparatus 1 is handed over to the customer by the user.

When performing the accounting processing according to an input from the user, a settlement means is selected by an operation on the accounting user interface 70 or a previous setting. Specifically, as a means for the customer to perform payment, a settlement by cash or a settlement by an IC card can be selected. When performing the accounting processing in a state where the settlement by cash is selected, the tablet terminal 3 transmits an open command to the printing apparatus 1 and causes the printing apparatus 1 to shift the cash drawer 4 to an open state. Thereby, cash can be extracted from and stored into the cash drawer 4, so that the user exchanges cash with the customer. For example, when the tablet terminal 3 detects that the transmission instruction image 76 of the accounting user interface 70 is touched, the tablet terminal 3 transmits the open command. When processing other than cash receipt and disbursement processing is completed in the accounting processing using the accounting user interface 70 and the tablet terminal 3 causes the printing apparatus 1 to issue a receipt R, the tablet terminal 3 transmits a command to instruct printing of the receipt R and the open command to the printing apparatus 1.

When performing the accounting processing in a state where an IC card is selected as the settlement means, the tablet terminal 3 transmits the IC card reader control command to the printing apparatus 1. Thereby, the IC card reader 6 becomes an active state, so that the IC card reader 6 can read the IC card.

Further, it is possible to use the IC card reader 6 to read a point card and a membership card, which are constituted of an IC card. In this case, the tablet terminal 3 transmits the IC card reader control command at a timing when reading the point card or the membership card in the accounting processing.

In this way, the tablet terminal 3 transmits the open command or the IC card reader control command to the printing apparatus 1 when the transmission instruction image 76 is operated and/or at a predetermined timing in the accounting processing.

As illustrated in FIG. 2, the printing apparatus 1 includes a printing apparatus control unit 20, a printing apparatus radio communication unit 22, a printing unit 24, a printing apparatus display unit 25, a beacon signal transmitting unit 26, a printing apparatus storage unit 21, and a printing apparatus device connection unit 23. The printing apparatus device connection unit 23 is connected with the cash drawer 4, the barcode scanner 5, and the IC card reader 6.

The printing apparatus control unit 20 includes hardware such as a CPU, a ROM, a RAM, and the like (which are not shown in the drawings). The printing apparatus control unit 20 controls each unit of the printing apparatus 1 by executing a predetermined program by the CPU. The ROM is a non-volatile storage apparatus. The ROM stores a control program executed by the CPU and data processed by the control program. The RAM forms a work area of the CPU. The CPU allocates the control program read from the ROM or the printing apparatus storage unit 21 in the RAM and executes the allocated control program to control each unit of the printing apparatus 1.

The printing apparatus radio communication unit 22 performs mutual radio communication with the tablet terminal radio communication unit 34 of the tablet terminal 3 under control of the printing apparatus control unit 20 and transmits and receives commands and various data.

The printing unit 24 includes a transport mechanism that transports a roll paper stored in the printing apparatus 1, a printing mechanism that prints an image by forming dots on the roll paper by using a thermal head, and a cutting mechanism that cuts the roll paper by using a cutter. For example, when issuing a receipt R, the printing apparatus 24 causes the transport mechanism to transport the roll paper under control of the printing apparatus control unit 20. The printing apparatus 24 prints information related to the receipt R on the roll paper by using the thermal head of the printing mechanism, cuts the roll paper at a predetermined position by using the cutter of the cutting mechanism, and issues the receipt R under control of the printing apparatus control unit 20.

The printing apparatus display unit 25 is connected to the LED display unit 15 (FIG. 1), and turns on, off, or blinks an LED included in the LED display unit 15. A display unit controlled by the printing apparatus display unit 25 is not limited to the LED display unit 15, but may be a display unit having a light source such as the organic EL lamp as described above. The printing apparatus 1 may include a liquid crystal panel. In this case, the printing apparatus display unit 25 controls display of the liquid crystal panel.

The beacon signal transmitting unit 26 transmits a beacon signal at fixed time intervals according to specific communication standards under control of the printing apparatus control unit 20. Thereby, the printing apparatus 1 functions as a beacon apparatus that transmits a beacon signal. A transmission output of the beacon signal outputted by the beacon signal transmitting unit 26 is constant.

The beacon signal transmitting unit 26 can transmit the beacon signal at all times while the power of the printing apparatus 1 is on. In this case, the beacon signal transmitting unit 26 starts/stops transmission of the beacon signal by interlocking with on/off of the power of the printing apparatus 1. The beacon signal transmitting unit 26 may transmits the beacon signal when an operating state of the printing apparatus 1 is a predetermined state. For example, when the printing apparatus is in a stopped state due to occurrence of an error, the beacon signal transmitting unit 26 may stop the transmission of the beacon signal.

A configuration where the beacon signal is transmitted from the printing apparatus 1 is not limited to the example of FIG. 2. For example, instead of the beacon signal transmitting unit 26, a transmitter that is formed as a body different from the printing apparatus 1 and transmits a beacon signal may be used. Specifically, it is possible to use a disposable transmitter containing a battery. By attaching the transmitter to, for example, a housing of the printing apparatus 1, it is possible to realize a configuration where the beacon signal is transmitted from the printing apparatus 1. The transmitter has a power source different from that of the printing apparatus 1 and operates independently from the printing apparatus 1, so that, for example, the transmitter transmits the beacon signal at all times without being influenced by an operating state of the printing apparatus 1.

The printing apparatus storage unit 21 includes a semiconductor memory element, a magnetic storage apparatus, and the like, and stores a program to be executed by the CPU of the printing apparatus control unit 20 and various data.

The printing apparatus device connection unit 23 includes one or a plurality of ports that connect to external devices by wire and an interface circuit (not shown in the drawings) that controls communication through the ports. The ports described above may be ports in compliance with USB (Universal Serial Bus) standard, a serial communication standard (RS232C or the like) other than the USB, and a parallel communication standard (IEEE1284 or the like). The printing apparatus device connection unit 23 may have a configuration including ports in compliance with the other communication standards. The printing apparatus device connection unit 23 performs communication with devices connected to the ports and transmits and receives various data and signals under control of the printing apparatus control unit 20. The printing apparatus device connection unit 23 may have a radio communication function and perform radio communication with the devices.

In FIG. 2, the cash drawer 4 is connected to the printing apparatus device connection unit 23 through a serial cable. Further, the barcode scanner 5 and the IC card reader 6 are connected to the printing apparatus device connection unit 23 through USB cables, respectively. As described later, the printing apparatus 1 can control the cash drawer 4 and the IC card reader 6 based on a command received from the tablet terminal 3. The IC card reader 6 corresponds to a reading apparatus.

The cash drawer 4 has a lock unit 43 and an opening/closing sensor 44.

The lock unit 43 has a mechanism that locks the tray 41 of the cash drawer 4 to the housing 42 in a closed state. The tray 41 is urged in a direction to be opened by an urging unit (not shown in the drawings) such as a spring. In a closed state, the tray 41 is held by the lock unit 43 so as not to be opened (so as to maintain the closed state). The lock unit 43 include an actuator 43a that releases the lock of the tray 41. When the actuator 43a is driven, the lock of the tray 41 is released, so that the tray 41 is moved by the urging force of the urging unit so as to protrude from the housing 42 and becomes an open state. In other words, the cash drawer 4 is unlocked.

The opening/closing sensor 44 is a sensor that detects a state of the cash drawer 4. Specifically, the opening/closing sensor 44 is a sensor that detects that the cash drawer 4 is in an open state or in a closed state. For example, the opening/closing sensor 44 may be a switch-type sensor whose output varies according to a position of the actuator 43a or a position of the tray 41. In a state in which the cash drawer 4 is connected to the printing apparatus device connection unit 23, the printing apparatus control unit 20 can acquire an output value of the opening/closing sensor 44. The printing apparatus control unit 20 can determine whether the cash drawer 4 is in the open state or in the closed state on the basis of the output value of the opening/closing sensor 44.

The printing apparatus 1 can cause the tray 41 to open by driving the actuator 43a of the cash drawer 4, in other words, can cause the cash drawer 4 to shift from the closed state to the open state. Further, the printing apparatus 1 can determine the state of the cash drawer 4 (can determine whether the cash drawer 4 is in the open state or in the closed state) based on the output value of the opening/closing sensor 44.

The barcode scanner 5 optically reads an image code such as a barcode or a two-dimensional code and outputs the read data to the printing apparatus device connection unit 23. In the POS system 100, a barcode attached to a package or a slip of a commodity is read by the barcode scanner 5. The printing apparatus device connection unit 23 outputs the data inputted from the barcode scanner 5 to the printing apparatus control unit 20.

The IC card reader 6 reads data recorded in the IC card and outputs the read data to the printing apparatus device connection unit 23. The IC card reader 6 has an IC card reader control unit 61 and a reading unit 62 that performs reading and/or writing data from and/or to the IC card according to control of the IC card reader control unit 61. Examples of an object of the operation of the reading unit 62 include a contact type IC card, a non-contact type IC card, and a radio tag (RF (Radio Frequency) tag). The printing apparatus device connection unit 23 outputs the data inputted from the IC card reader control unit 61 to the printing apparatus control unit 20.

The IC card reader 6 can switch between two operating states, which are an active state in which the IC card reader 6 performs an operation of reading/writing on an IC card and an inactive state in which the IC card reader 6 does not perform an operation of reading/writing on an IC card. In the active state, the IC card reader 6 performs detection of an IC card, and when the IC card reader 6 detects an IC card that can be read by the reading unit 62, the IC card reader 6 reads information from the detected IC card and waits for a reading/writing operation after that. In the inactive state, the IC card reader 6 does not performs detection of an IC card. Therefore, even when an IC card approaches a position where the reading unit 62 can read the IC card or the IC card is connected to the reading unit 62, the reading unit 62 does not perform reading from the IC card.

The switching between the active state and the inactive state of the IC card reader 6 is performed by the IC card reader control unit 61. The IC card reader control unit 61 switches the operating state of the IC card reader 6 according control data transmitted from the printing apparatus device connection unit 23.

In a usage environment of the POS system 100, the tablet terminal 3 may be used at a position away from the printing apparatus 1 as described above. In this case, the cash drawer 4 and the IC card reader 6 are also away from the tablet terminal 3. The cash drawer 4 is an apparatus that stores cash and the IC card reader 6 is an apparatus that performs settlement, so that in a security aspect, it is preferable that visual monitoring or management is performed by a user when these apparatuses are operating. The cash drawer 4 and/or the IC card reader 6 are, so to speak, apparatuses to be monitored by the user.

Therefore, when the distance between the tablet terminal 3 and the printing apparatus 1 is large, in other words, when the tablet terminal 3 is far away from the printing apparatus 1, the POS system 100 shifts to a state in which transmission of a command related to settlement is suppressed. This state is one of the operating states of the tablet terminal 3 and is called a command transmission suppression state in the description below. In the command transmission suppression state, the tablet terminal 3 does not transmit the open command and the IC card reader control command to the printing apparatus 1. Therefore, the cash drawer 4 is not opened, and the IC card reader 6 does not shift to the active state.

The tablet terminal 3 uses a predetermined value as a reference for determining whether or not a condition to shift to the command transmission suppression state is established. The predetermined value is a threshold value of the distance between the printing apparatus 1 and the tablet terminal 3. The predetermined value is set in advance and stored in the tablet terminal 3. Specifically, the predetermined value is included in the predetermined-value data 33a stored in the tablet terminal storage unit 33.

The predetermined value is set to a value where it becomes difficult for a user who uses the tablet terminal 3 to visually manage an object to be monitored. When an apparatus to be monitored is not under the monitoring of the user or is in a state where it is highly probable that the monitoring becomes difficult, the tablet terminal 3 determines that the condition to shift to the command transmission suppression state is established and shifts to the command transmission suppression state.

Here, the tablet terminal 3 determines a reception signal intensity when receiving the beacon signal transmitted by the printing apparatus 1 by using the predetermined value as a reference in order to detect the distance between the printing apparatus 1 and the tablet terminal 3. In other words, the tablet terminal 3 shifts to the command transmission suppression state on the basis of the reception signal intensity of the beacon signal transmitted by the printing apparatus 1.

The reception signal intensity of the beacon signal approximately reflects the distance between the printing apparatus 1 and the tablet terminal 3, so that it is rational to detect the distance between the printing apparatus 1 and the tablet terminal 3 on the basis of the reception signal intensity of the beacon signal.

The correlation between the reception signal intensity and the distance is not strict and accurate. For example, the reception signal intensity is affected by an environment where the POS system 100 is used. Specifically, the beacon signal may be attenuated by existence of so-called obstacles such as a pillar and a wall. However, the obstacle, which is an element that attenuates the beacon signal, may often an object that interrupts user's visual field. Therefore, these objects may be elements that make it difficult for the user to visually monitor the apparatus to be monitored. Also from this point of view, it is rational to perform determination based on the reception signal intensity of the beacon signal transmitted from the printing apparatus 1 and shift into the command transmission suppression state.

Of course, when detecting the distance between the printing apparatus 1 and the tablet terminal 3 by using another method, it is rational to shift into the command transmission suppression state when the tablet terminal 3 is far away from the printing apparatus 1 as described above.

As an operating state of the tablet terminal 3, in addition to the command transmission suppression state, there is an operating state where the tablet terminal 3 can transmit the open command and the IC card reader control command. Such an operating state is called a normal operation state in the description below.

Further, there are commands that can be transmitted by the tablet terminal 3 in both the normal operation state and the command transmission suppression state. The commands whose transmissions are suppressed by the tablet terminal 3 in the command transmission suppression state are part of commands that can be transmitted by the tablet terminal 3, and are specifically commands related to settlement (more specifically, commands indicating control of a device used for the settlement). These commands whose transmissions are suppressed can be called, for example, suppression target commands. The open command and the IC card reader control command described above are included in the suppression target commands. Examples of the commands transmitted by the tablet terminal 3 other than the suppression target commands include a print command, a status request command, a setting command, and a reset command. The print command is a command that causes the printing apparatus 1 to print a receipt R or the like. The status request command is a command that requests the printing apparatus 1 to transmit status information showing an operating state. The setting command is a command for transmitting print setting and operation setting to the printing apparatus 1. The reset command is a command for transmitting an instruction of reset to the printing apparatus 1.

Even in the command transmission suppression state, the tablet terminal 3 can receive and transmit commands other than the suppression target commands. Of course, in the normal operation state, the tablet terminal 3 can transmit commands including the suppression target commands.

Figure 4:
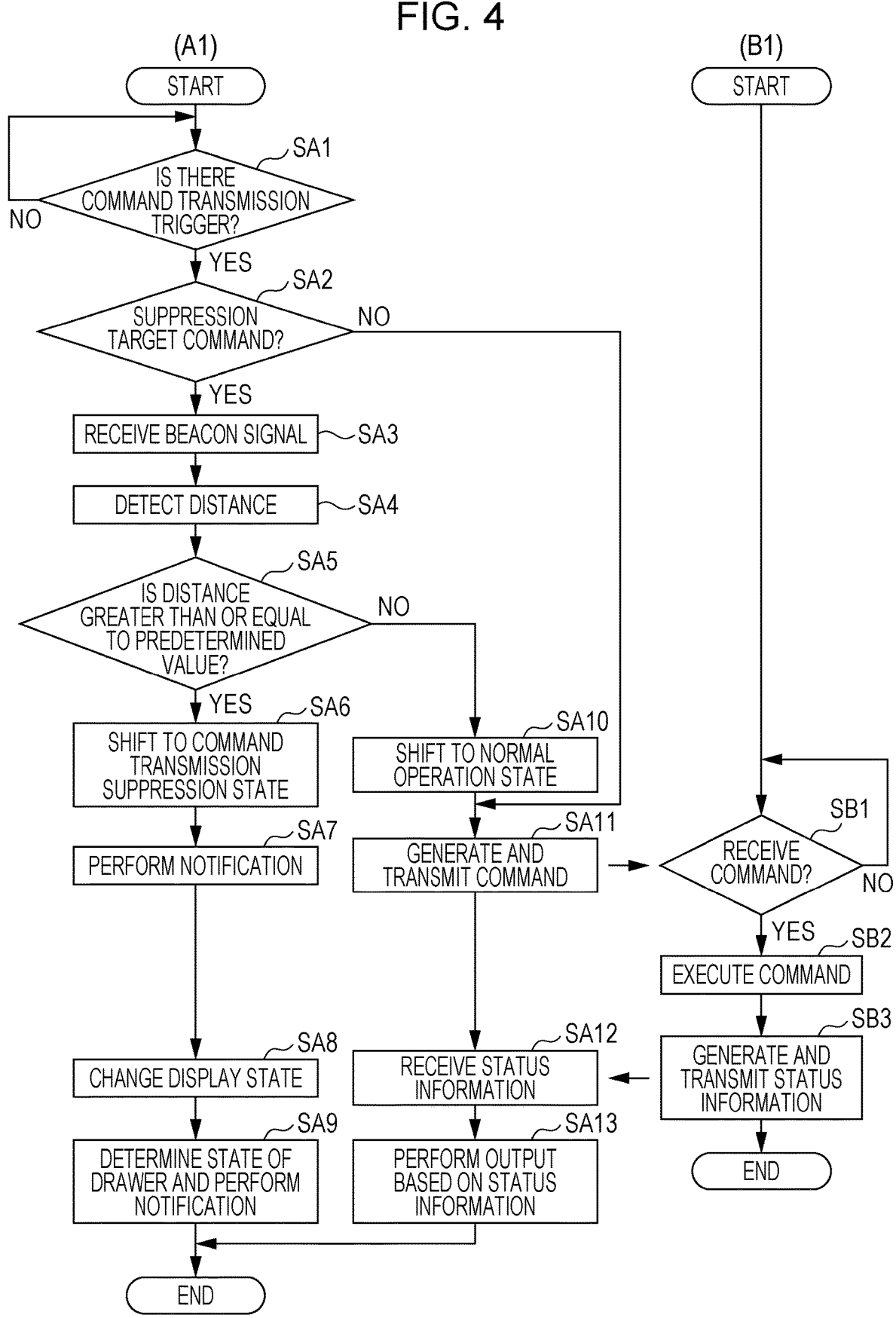
FIG. 4 is a flowchart showing an operation of the POS system.

Hereinafter, operations of the tablet terminal 3 and the printing apparatus 1 of the present embodiment will be described. FIG. 4 is a flowchart showing an operation of the POS system 100. The sign A1 in FIG. 4 indicates an operation flow of the tablet terminal 3 and the sign B1 indicates an operation flow of the printing apparatus 1.

The processing unit 30a of the tablet terminal control unit 30 determines the presence or absence of a trigger for transmitting a command to the printing apparatus 1 (step SA1). The trigger for transmitting a command is detection of a touch operation to the transmission instruction image 76 of the accounting user interface 70. Further, reaching the timing of transmitting the open command or the IC card reader control command in the accounting processing described above also corresponds to the trigger. When the trigger for transmitting a command does not occur ((there is no command transmission trigger) step SA1: NO), the tablet terminal control unit 30 waits in step SA1 until the trigger for transmitting a command occurs.

When detecting the trigger for transmitting a command ((there is a command transmission trigger) step SA1: YES), the tablet terminal control unit 30 determines whether or not a type of the command to be transmitted is a suppression target command (step SA2). When the processing unit 30a determines that the type of the command to be transmitted is the suppression target command (step SA2: YES), the processing unit 30a proceeds to step SA3.

The detection unit 30b detects that the beacon signal receiving unit 35 receives a beacon signal (step SA3), and detects a distance to the printing apparatus 1 on the basis of a reception signal intensity of the beacon signal in the beacon signal receiving unit 35 (step SA4).

The processing unit 30a compares a predetermined value included in the predetermined-value data 33a stored in the tablet terminal storage unit 33 with the distance detected by the detection unit 30b in step SA4, and determines whether or not the distance detected by the detection unit 30b is greater than or equal to the predetermined value (step SA5).

In step SA4, the detection unit 30b cannot detect the distance in a state where the beacon signal receiving unit 35 does not receive the beacon signal. Therefore, the tablet terminal control unit 30 waits in step SA3 until the beacon signal receiving unit 35 receives the beacon signal. However, an upper limit may be set to the time for the tablet terminal control unit 30 to wait for receiving the beacon signal in step SA3. The upper limit of the waiting time can be determined by, for example, a setting value stored in the tablet terminal storage unit 33.

In this case, the tablet terminal control unit 30 ends the waiting when the waiting time reaches the upper limit after the tablet terminal control unit 30 determines in step SA2 that the type of the command to be transmitted is the suppression target command. The tablet terminal control unit 30 performs processing of step SA4 by using the reception signal intensity when the beacon signal receiving unit 35 previously received the beacon signal, and detects the distance by using the detection unit 30b. Alternatively, the tablet terminal control unit 30 may perform the determination of step SA4 by comparing a distance that was previously detected by the detection unit 30b with a predetermined value. The above configuration can be realized by storing the reception signal intensity when the beacon signal receiving unit 35 receives the beacon signal and/or the distance detected by the detection unit 30b into the tablet terminal storage unit 33 or the RAM of the tablet terminal control unit 30. In these cases, it is preferable that the reception signal intensity referred to in step SA4 and the distance referred to in step SA5 are the latest data among the reception signal intensities and the distances in the past. For example, the tablet terminal storage unit 33 or the RAM may store the latest reception signal intensity and the latest distance at all times.

When determining that the distance to the printing apparatus 1 is greater than or equal to the predetermined value (step SA5: YES), the processing unit 30a shifts to the command transmission suppression state (step SA6). The processing unit 30a notifies that the distance to the printing apparatus 1 is greater than or equal to the predetermined value by display of the touch panel 32 ((notification execution) step SA7). In this operation, the touch panel 32 corresponds a notification unit. When the operating state of the tablet terminal 3 is already the command transmission suppression state in step SA6, the processing unit 30a maintains the command transmission suppression state. Also in this case, it is preferable to perform notification in step SA7. In step SA7, specifically, a message by characters or an image indicating that the distance to the printing apparatus 1 is large is displayed in the message section 75 of the accounting user interface 70. This information has an effect to notify a user that the distance between the tablet terminal 3 and the printing apparatus 1 is large and the tablet terminal 3 is away from the printing apparatus 1. In step SA7, the processing unit 30a may perform the notification by outputting a voice that notifies that the distance to the printing apparatus 1 is greater than or equal to the predetermined value from the speaker 31.

Further, the processing unit 30a changes a display state of the transmission instruction image 76 of the accounting user interface 70 to a display state showing that no operation is possible (step SA8).

In the normal operation state, the transmission instruction image 76 is displayed as a button having a color, a size, and a shape that are set in advance in the accounting user interface 70. This display state is a normal display state, more specifically, a display state not in the command transmission suppression state. In the command transmission suppression state, the processing unit 30a sets the display state of the transmission instruction image 76 to a grayed-out display. Therefore, when proceeding to the command transmission suppression state in step SA6, the processing unit 30a changes the display state of the transmission instruction image 76.

The grayed-out display is a display state where a display color of the transmission instruction image 76 in the accounting user interface 70 is displayed by a color paler than that in the normal display state or a color such as gray whose saturation and/or brightness are low. The grayed-out display is a method of representing that an operation on the transmission instruction image 76 is invalid or invalidated. When the display state of the transmission instruction image 76 is changed to the grayed-out display, a user can know that the cash drawer 4 cannot be shifted to the open state.

The processing unit 30a can perform the operation to display information in the message section 75 or the operation to output a voice in step SA7 and the operation to switch the transmission instruction image 76 to the grayed-out display in step SA8 in inverse order or at the same time. Further, when the processing unit 30a performs the notification by display in step SA7, the processing unit 30a may notify that a command is not transmitted (has not been transmitted) as well as that the state is shifted to the command transmission suppression state.

Next, the state determination unit 30c determines the state of the cash drawer 4, and the processing unit 30a performs notification according to a determination result (step SA9).

In step SA9, the state determination unit 30c determines whether the cash drawer 4 is in an open state or in a closed state. For example, in step SA9, the state determination unit 30c may transmit a command inquiring whether the cash drawer 4 is in the open state or in the closed state from the tablet terminal radio communication unit 34 to the printing apparatus 1. Specifically, the state determination unit 30c transmits a status request command that requests transmission of status information including a state of the cash drawer 4 (indicating whether the cash drawer is in the open state or in the closed state). The state determination unit 30c can determine the state of the cash drawer 4 on the basis of the status information transmitted by the printing apparatus 1 in response to the command. Further, the state determination unit 30c may determine whether the cash drawer 4 is in the open state or in the closed state from a command that was transmitted from the tablet terminal 3 to the printing apparatus 1 in the past or a history of the status information received from the printing apparatus 1.

When the cash drawer 4 is determined to be in the open state, the processing unit 30a performs notification. The processing unit 30a may perform notification by voice by, for example, causing the speaker 31 to output a voice indicating that the cash drawer 4 is in the open state. Further, the processing unit 30a may perform notification by display by displaying information notifying that the cash drawer 4 is in the open state on the touch panel 32. For example, this information can be displayed in the message section 75 of the accounting user interface 70. Thereby, the tablet terminal 3 can notify that the tablet terminal 3 and the cash drawer 4 are away from each other and the cash drawer 4 is in the open state. After performing the operation of the step SA9, the tablet terminal control unit 30 ends the present processing.

In step SA9, the state determination unit 30c may determine whether or not the state of the IC card reader 6 is an active state. In this case, the processing unit 30a may perform notification when the state determination unit 30c determines that the IC card reader 6 is in the active state.

On the other hand, when the processing unit 30a determines that the distance detected by the detection unit 30b is shorter than the predetermined value (step SA5: NO), the processing unit 30a shifts to the normal operation state (step SA10). When the operating state of the tablet terminal 3 is already the normal operation state in step SA10, the processing unit 30a maintains the normal operation state. In step SA10, the processing unit 30a shifts to the normal operation state and sets the display state of the transmission instruction image 76 to the normal display state. When the transmission instruction image 76 is already in the normal display state in step SA10, the processing unit 30a does not change the display state. When the transmission instruction image 76 is gray-out displayed in step SA10, the grayed-out display is released and changed to the normal display state.

The processing unit 30a generates a command corresponding to the trigger in step SA1, and transmits the command from the tablet terminal radio communication unit 34 to the printing apparatus 1 (step SA11).

When the processing unit 30a determines that the command corresponding to the trigger in step SA1 is not the suppression target command (step SA2: NO), the processing unit 30a generates and transmits the command (step SA11).

The printing apparatus control unit 20 determines whether or not the printing apparatus radio communication unit 22 receives a command from the tablet terminal 3 (step SB1). When not receiving a command (step SB1: NO), the printing apparatus control unit 20 waits in step SB1 until receiving a command.

When receiving a command from the tablet terminal 3 (step SB1: YES), the printing apparatus control unit 20 executes the command received in step SB1 (step SB2). For example, when receiving the open command in step SB1, the printing apparatus control unit 20 controls the cash drawer 4 on the basis of the open command and brings the cash drawer 4 into the open state in step SB2. Here, the printing apparatus control unit 20 outputs a signal to drive the actuator 43a to the cash drawer 4 from, for example, the printing apparatus device connection unit 23 through a serial cable. The printing apparatus control unit 20 may confirm that the cash drawer 4 has shifted to the open state by acquiring an output value of the opening/closing sensor 44 of the cash drawer 4 through the printing apparatus device connection unit 23.

When receiving the IC card reader control command in step SB1, the printing apparatus control unit 20 transmits control data to the IC card reader 6 from the printing apparatus device connection unit 23 in step SB2 and shifts the IC card reader 6 to the active state.

When receiving the print command in step SB1, the printing apparatus control unit 20 performs a printing operation by controlling the printing unit 24 based on the print command in step SB2 and, for example, issues a receipt R.

In addition, the printing apparatus control unit 20 can perform various commands such as the setting command and the status request command in step SB2.

After performing the commands in step SB2, the printing apparatus control unit 20 generates status information and transmits the status information to the tablet terminal 3 (step SB3). The status information generated here by the printing apparatus control unit 20 includes information indicating an execution result of a command transmitted by the tablet terminal 3. The status information may include, but need not include, various information such as information indicating an operation of the printing apparatus 1.

The processing unit 30a receives the status information transmitted by the printing apparatus 1 by using the tablet terminal radio communication unit 34 (step SA12). The processing unit 30a performs an output based on the received status information (step SA13) and ends the present processing.

In step SA13, the processing unit 30a performs a display based on the status information in, for example, the message section 75 of the accounting user interface 70. For example, the tablet terminal control unit 30 displays a message indicating that the cash drawer 4 is unlocked in the message section 75.

In the command transmission suppression state, the processing unit 30a may stop or suppress processing of data received from the printing apparatus 1 through the tablet terminal radio communication unit 34. In this case, examples of data transmitted by the printing apparatus 1 include data read by the barcode scanner 5 and data read by the IC card reader 6. When the processing unit 30a receives the above data through the tablet terminal radio communication unit 34 in the command transmission suppression state, the processing unit 30a suppresses or stops accounting processing or the like based on these data. According to this configuration, when the distance between the tablet terminal 3 and the printing apparatus 1 is greater than or equal to a predetermined value, it is possible to suppress progress of data processing between the printing apparatus 1 and the tablet terminal 3, so that it is possible to achieve appropriate processing. Specifically, in a situation where it is difficult for a user to manage or monitor apparatuses such as the barcode scanner 5 and the IC card reader 6 connected to the printing apparatus 1, it is possible to prevent progress of accounting processing based on data inputted from these apparatuses, so that it is possible to more reliably secure accuracy of the accounting processing.

As described above, the tablet terminal 3 of the present embodiment includes the detection unit 30b that detects the distance to the printing apparatus 1 and the tablet terminal radio communication unit 34 that transmits a command indicating control of the printing apparatus 1. The tablet terminal 3 includes the processing unit 30a that suppresses transmission of the suppression target commands to be transmitted by the tablet terminal radio communication unit 34 when the distance to the printing apparatus 1 detected by the detection unit 30b is greater than or equal to a predetermined value. As described in the present embodiment, examples of the commands to control the printing apparatus 1 include a command indicating an operation to control the cash drawer 4 for the printing apparatus 1 and a command indicating an operation to shift the IC card reader 6 to an active state.

According to the tablet terminal 3 to which the invention is applied and the control method of the tablet terminal 3, when the distance to the printing apparatus 1 detected by the detection unit 30b is greater than or equal to a predetermined value, the tablet terminal 3 can suppress the transmission of the suppression target commands. Thereby, in a state in which the distance between the tablet terminal 3 and the printing apparatus 1 is greater than or equal to the predetermined value, it is possible to restrain the printing apparatus 1 from executing a command and it is possible to cause the printing apparatus 1 to execute a command more appropriately.

The tablet terminal 3 includes the touch panel 32, and when the distance to the printing apparatus 1 detected by the detection unit 30b is greater than or equal to the predetermined value, the processing unit 30a notifies accordingly by using display of the touch panel 32. For example, the tablet terminal 3 displays information indicating that the distance to the printing apparatus 1 is greater than or equal to the predetermined value in the message section 75 in the accounting user interface 70 displayed on the tablet terminal 3. According to this configuration, the tablet terminal 3 displays information indicating that the distance to the printing apparatus 1 is greater than or equal to the predetermined value on the touch panel 32. By this display, it is possible to easily inform a user who uses the tablet terminal 3 that the distance from the printing apparatus 1 is greater than or equal to the predetermined value.

Further, the processing unit 30a causes the touch panel 32 to display the transmission instruction image 76 that causes the tablet terminal radio communication unit 34 to transmit a command according to an operation. When the distance to the printing apparatus 1 detected by the detection unit 30b is greater than or equal to the predetermined value, the processing unit 30a displays the transmission instruction image 76 in an inoperable manner. For example, the processing unit 30a changes the display state of the transmission instruction image 76 from the normal display state to the grayed-out display. According to this configuration, in a configuration where a command is transmitted to the printing apparatus 1 according to an operation of the tablet terminal 3, it is possible to disable an operation for transmitting a command, and further it is possible to notify a user that the operation is disabled through a display. Therefore, when the distance between the tablet terminal 3 and the printing apparatus 1 is greater than or equal to the predetermined value, it is possible to suppress or prevent an operation which is related to transmission of a command and is performed by a user who operates the tablet terminal 3 and it is possible to optimize execution of a command.

The tablet terminal 3 includes the tablet terminal radio communication unit 34 that receives data from the printing apparatus 1. The processing unit 30a may have a configuration where the processing unit 30a does not perform processing based on data received by the tablet terminal radio communication unit 34 when the distance to the printing apparatus 1 detected by the detection unit 30b is greater than or equal to the predetermined value. In this case, in a state in which the distance between the tablet terminal 3 and the printing apparatus 1 is greater than or equal to the predetermined value, the tablet terminal 3 can suppress progress of data processing between the printing apparatus 1 and the tablet terminal 3 and optimize the data processing.

The printing apparatus 1 can be connected to the cash drawer 4, and the command transmitted by the tablet terminal 3 may be the open command that indicates causing the cash drawer 4 to be the open state. In this case, in a configuration where the cash drawer 4 is connected to the printing apparatus 1 and the printing apparatus 1 controls the cash drawer 4 on the basis of the open command received from the tablet terminal 3, the tablet terminal 3 suppresses transmission of the open command. Thereby, it is possible to optimize the control of the cash drawer 4 performed by the printing apparatus 1.

The tablet terminal 3 includes the state determination unit 30c that determines an open/closed state of the cash drawer 4 and the speaker 31. When the cash drawer 4 is determined to be in the open state by the state determination unit 30c and a distance to the cash drawer 4 detected by the detection unit 30b is greater than or equal to a predetermined value, the processing unit 30a notifies this situation by using the speaker 31. According to this configuration, the tablet terminal 3 can notify that the cash drawer 4 is in the open state by using the speaker 31 when the tablet terminal 3 and the cash drawer 4 are away from each other and the cash drawer 4 is in the open state. The tablet terminal 3 may use the touch panel 32 as a notification unit. In this case, the tablet terminal 3 can display and notify that the distance between the printing apparatus 1 and the tablet terminal 3 is greater than or equal to the predetermined value and the cash drawer 4 is opened.

In the POS system 100, the printing apparatus 1 can be connected to the IC card reader 6 that reads data from an IC card. The tablet terminal 3 transmits the IC card reader control command that switches the operating state of the IC card reader 6 to an active state to the printing apparatus 1 as a command for controlling an operation of an external apparatus. In this configuration, when the printing apparatus 1 is connected with the IC card reader 6 and the printing apparatus 1 controls the IC card reader 6 on the basis of a command received from the tablet terminal 3, transmission of the IC card reader control command from the tablet terminal 3 to the printing apparatus 1 is suppressed. Thereby, it is possible to optimize control of the IC card reader 6 that reads data from an IC card.

In the embodiment described above, a configuration (step SA4) is described where the detection unit 30b calculates the distance between the printing apparatus 1 and the tablet terminal 3 on the basis of the reception signal intensity of the beacon signal in the beacon signal receiving unit 35. In this configuration, the processing unit 30a determines whether or not to shift to the command transmission suppression state on the basis of the distance calculated by the detection unit 30b (step SA5).

The configuration of the invention is not limited to this, and for example, the processing unit 30a may determine whether or not to shift to the command transmission suppression state on the basis of the reception signal intensity of the beacon signal receiving unit 35.

Specifically, the detection unit 30b acquires the reception signal intensity of the beacon signal in the beacon signal receiving unit 35. Here, the detection unit 30b may convert the reception signal intensity to values that represent the reception signal intensity in a stepwise manner. For example, the detection unit 30b may determine the reception signal intensity of the beacon signal receiving unit 35 in a stepwise manner on the bases of a plurality of reference values set in advance and output the determined steps.

The processing unit 30a performs an operation to determine whether or not to shift to the command transmission suppression state on the basis of the reception signal intensity acquired by the detection unit 30b or the values that represent the reception signal intensity in a stepwise manner. This operation is performed instead of step SA5 (FIG. 4 (flow A1)) described above. In this case, the processing unit 30a may use a predetermined value as a value to determine the reception signal intensity of the beacon signal. The predetermined value may be included in the predetermined-value data 33a as a value different from the predetermined value used to determine the distance between the printing apparatus 1 and the tablet terminal 3.

In this configuration, the tablet terminal 3 includes the beacon signal receiving unit 35 that receives the beacon signal and the tablet terminal radio communication unit 34 that transmits a command indicating control of an external apparatus. The tablet terminal 3 includes the processing unit 30a that suppresses transmission of the command to be transmitted by the tablet terminal radio communication unit 34 on the basis of the intensity of the beacon signal received by the beacon signal receiving unit 35. An example of the command indicating control of an external apparatus is the suppression target command described above.

According to this configuration, it is possible to suppress transmission of a command from the tablet terminal 3 on the basis of the intensity of the beacon signal received by the tablet terminal 3 through the beacon signal receiving unit 35. For example, when the intensity of the beacon signal received by the tablet terminal 3 is smaller than or equal to a predetermined value, it is possible to suppress transmission of a command from the tablet terminal 3 to the printing apparatus 1. In this case, it is possible to suppress transmission of a command in a situation where the reception intensity of the beacon signal decreases, such as a case where the tablet terminal 3 is far away from a transmission source of the beacon signal. In this way, the transmission of a command is suppressed on the basis of the intensity of the beacon signal, which reflects effects of the position and an installation environment of the tablet terminal 3. Thereby, it is possible to optimize the transmission of a command from the tablet terminal 3 to the printing apparatus 1 and cause the printing apparatus 1 to appropriately execute the command.

Second Embodiment

Hereinafter, a second embodiment of the invention will be described with reference to the drawings. In the second embodiment, the same components as those of the first embodiment are denoted by the same reference numerals and the description thereof may be omitted or simplified.

In the first embodiment, as described above, the tablet terminal 3 receives the beacon signal transmitted by the printing apparatus 1 and detects the distance to the printing apparatus 1, and when the distance is greater than or equal to the predetermined value, the tablet terminal 3 suppresses the transmission of a command to the printing apparatus 1.

On the other hand, in the second embodiment, as described later, a printing apparatus 201 receives a beacon signal transmitted by a tablet terminal 203 and detects a distance to the tablet terminal 203, and when the distance is greater than or equal to a predetermined value, the printing apparatus 201 limits execution of a command received from the tablet terminal 203. In the description below, differences from the first embodiment will be mainly described.

Figure 5:
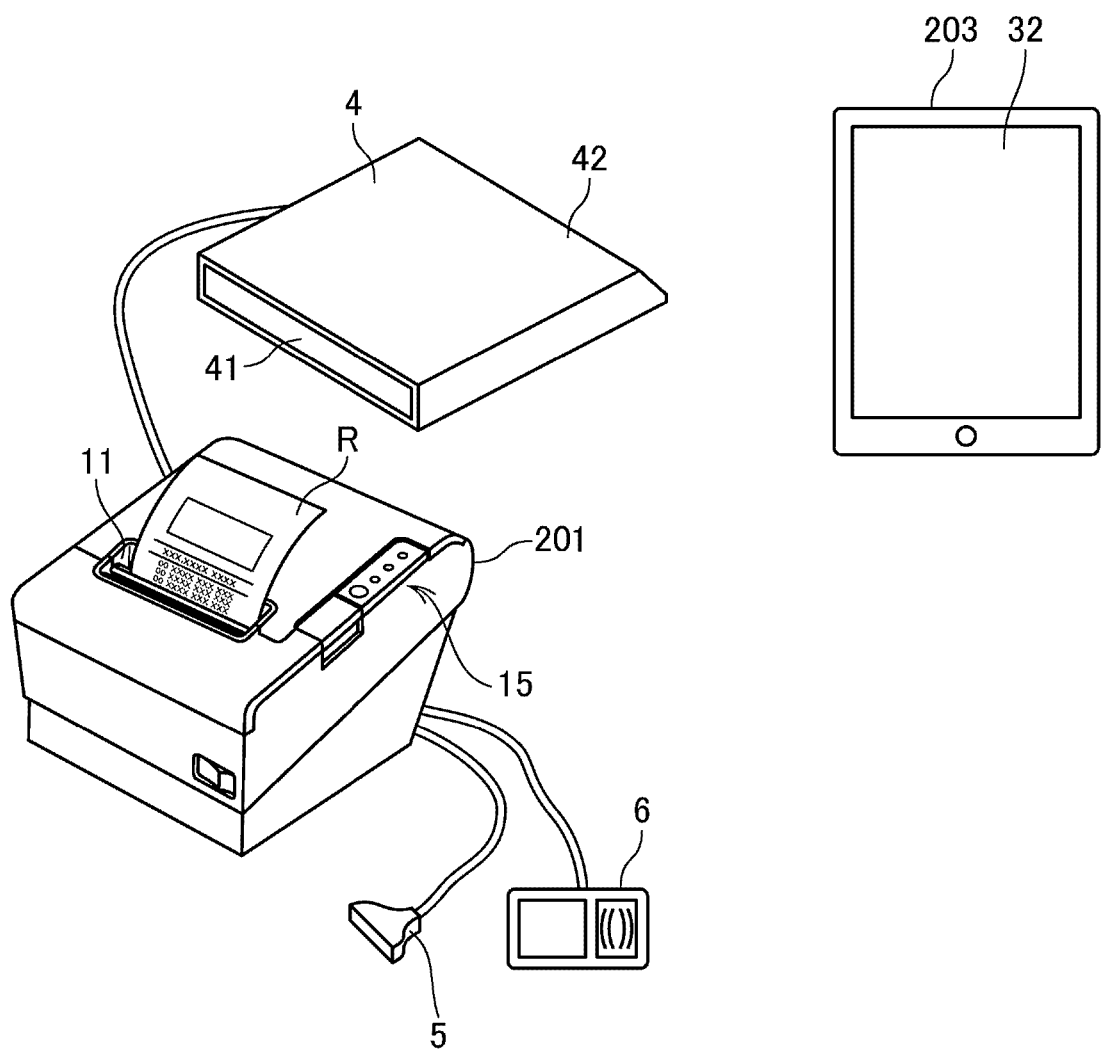
FIG. 5 is an outline diagram showing a configuration of a POS system according to an embodiment of the invention.

FIG. 5 is an outline diagram showing a configuration of a POS system 200.

The POS system 200 includes the tablet terminal 203 and the printing apparatus 201. The tablet terminal 203 performs accounting processing according to accounting. The printing apparatus 201 is connected to the tablet terminal 203 through radio communication (wireless communication) and issues a receipt R by being controlled by the tablet terminal 203.

The POS system 200 may have a configuration including the cash drawer 4, the barcode scanner 5, and the IC card reader 6. A usage environment and a use form of the printing apparatus 201, the tablet terminal 203, the cash drawer 4, the barcode scanner 5, and the IC card reader 6 are the same as those of the first embodiment described above, so that detailed description thereof will be omitted.

In the POS system 200, the printing apparatus 201 detects the distance between the printing apparatus 201 and the tablet terminal 203. As a specific configuration for the printing apparatus 201 to detect the distance between the printing apparatus 201 and the tablet terminal 203, the POS system 200 of the present embodiment transmits a beacon signal from the tablet terminal 203 to the printing apparatus 201. Examples of the beacon signal transmitted from the tablet terminal 203 include a radio beacon that uses a wireless radio wave of 2.5 GHz band and an optical beacon that uses infrared light (IR). However, in the present embodiment, a beacon signal of a wireless radio wave is used.

The beacon signal transmitted from the tablet terminal 203 attenuates until the beacon signal is received by the printing apparatus 201, and the intensity of the received beacon signal when the printing apparatus 201 receives the beacon signal roughly reflects the distance between the printing apparatus 201 and the tablet terminal 203. Therefore, it is possible to estimate, calculate, or approximate the distance between the printing apparatus 201 and the tablet terminal 203 on the basis of the intensity of the beacon signal received by the printing apparatus 201. The processing of estimating or calculating the distance or an approximate distance between the printing apparatus 201 and the tablet terminal 203 is called detecting the distance.

Figure 6:
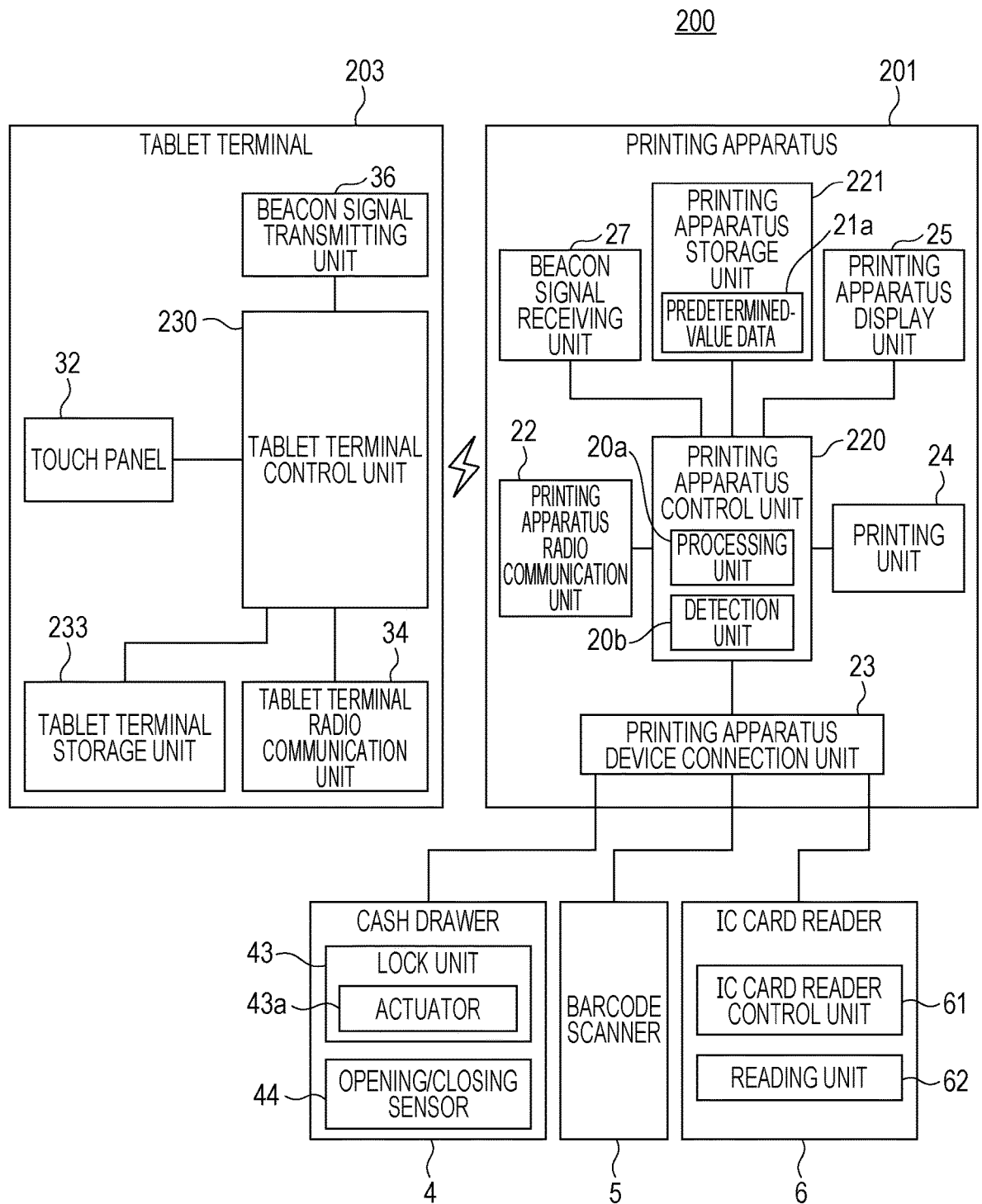
FIG. 6 is a block diagram showing a functional configuration of each apparatus included in the POS system.

FIG. 6 is a block diagram showing a functional configuration of each apparatus included in the POS system 200 and shows functional blocks of the printing apparatus 201 and the tablet terminal 203. The printing apparatus 201 corresponds to a control apparatus, and the tablet terminal 203 corresponds to a terminal apparatus.

The tablet terminal 203 includes a tablet terminal control unit 230, a tablet terminal storage unit 233, the tablet terminal radio communication unit 34, a beacon signal transmitting unit 36, and the touch panel 32.

The tablet terminal control unit 230 includes hardware such as a CPU, a ROM, a RAM, and the like (which are not shown in the drawings). The CPU allocates a control program read from the ROM or the tablet terminal storage unit 233 in the RAM and executes the allocated control program to control each unit of the tablet terminal 203.

The tablet terminal storage unit 233 stores programs and data in a non-volatile manner. The tablet terminal storage unit 233 includes a semiconductor memory element, a magnetic storage apparatus, and the like and stores a program executed by the CPU of the tablet terminal control unit 230 and various data.

The beacon signal transmitting unit 36 transmits a beacon signal at fixed time intervals according to specific communication standards under control of the tablet terminal control unit 230. Thereby, the tablet terminal 203 functions as a beacon apparatus that transmits a beacon signal. A transmission output of the beacon signal outputted by the beacon signal transmitting unit 36 is constant.

The beacon signal transmitting unit 36 can transmit the beacon signal at all times while the power of the tablet terminal 203 is on. In this case, the beacon signal transmitting unit 36 starts/stops transmission of the beacon signal by interlocking with on/off of the power of the tablet terminal 203. The beacon signal transmitting unit 36 may transmits the beacon signal when an operating state of the tablet terminal 203 is a predetermined state. For example, while the tablet terminal 203 performs accounting processing described later or displays the accounting user interface 70, the beacon signal transmitting unit 36 may transmits the beacon signal, and otherwise, the beacon signal transmitting unit 36 may stop the transmission of the beacon signal.

A configuration where the beacon signal is transmitted from the tablet terminal 203 is not limited to the example of FIG. 6. For example, instead of the beacon signal transmitting unit 36, a transmitter that is formed as a body different from the tablet terminal 203 and transmits a beacon signal may be used. Specifically, it is possible to use a disposable transmitter containing a battery. By attaching the transmitter to, for example, a housing of the tablet terminal 203, it is possible to realize a configuration where the beacon signal is transmitted from the tablet terminal 203. The transmitter has a power source different from that of the tablet terminal 203 and operates independently from the tablet terminal 203, so that, for example, the transmitter transmits the beacon signal at all times without being influenced by an operating state of the tablet terminal 203. The tablet terminal 203 uses, for example, a built-in battery (not shown in the drawings) as a power source and is operated by power supplied from the battery. In the example of FIG. 6, the beacon signal transmitting unit 36 is operated by the power of the battery of the tablet terminal 203. However, the transmitter that is a body different from the tablet terminal 203 can be operated by a power source different from the battery of the tablet terminal 203.

The tablet terminal radio communication unit 34 and the touch panel 32 are the same as those of the first embodiment described above, so that detailed description thereof will be omitted. These units operate under control of the tablet terminal control unit 230, and data and signals are inputted and outputted between these units and the tablet terminal control unit 230.

As illustrated in FIG. 6, the printing apparatus 201 includes a printing apparatus control unit 220, the printing apparatus radio communication unit 22, the printing unit 24, the printing apparatus display unit 25, a beacon signal receiving unit 27, a printing apparatus storage unit 221, and the printing apparatus device connection unit 23. The printing apparatus device connection unit 23 is connected with the cash drawer 4, the barcode scanner 5, and the IC card reader 6.

The printing apparatus control unit 220 includes hardware such as a CPU, a ROM, a RAM, and the like (which are not shown in the drawings). The printing apparatus control unit 220 allocates a control program read from the ROM or the printing apparatus storage unit 221 in the RAM by using the CPU and executes the allocated control program to control each unit of the printing apparatus 201. The printing apparatus control unit 220 includes a processing unit 20a and a detection unit 20b. The processing unit 20a and the detection unit 20b are functional units that are realized by cooperation of hardware and software when the CPU of the printing apparatus control unit 220 executes a program. The processing unit 20a corresponds to a control unit.

The beacon signal receiving unit 27 receives a beacon signal that is a radio signal of a predetermined frequency and outputs a control signal indicating that the beacon signal is received to the printing apparatus control unit 220. The control signal outputted by the beacon signal receiving unit 27 includes information indicating a reception signal intensity when the beacon signal receiving unit 27 receives the beacon signal. The beacon signal receiving unit 27 corresponds to a beacon receiving unit.

The beacon signal receiving unit 27 has a configuration suitable to receive the beacon signal transmitted by the tablet terminal 203. However, the beacon signal receiving unit 27 may receive signals other than the beacon signal transmitted by the tablet terminal 203. For example, the beacon signal transmitted by the tablet terminal 203 may include an identification code, and the beacon signal receiving unit 27 may identify a transmission source by the identification code included in the received beacon signal. In this case, it is possible to realize a configuration where the beacon signal receiving unit 27 receives only a beacon signal transmitted by a specific transmission source (for example, the tablet terminal 203).

The detection unit 20b detects a distance between the tablet terminal 203 and the printing apparatus 201. As described above, a plurality of methods for detecting the distance between the tablet terminal 203 and the printing apparatus 201 are considered. However, in the present embodiment, the detection unit 20b obtains the distance between the tablet terminal 203 and the printing apparatus 201 based on the reception signal intensity when the beacon signal receiving unit 27 receives the beacon signal. The distance calculated by the detection unit 20b need not necessarily be an accurate distance between the tablet terminal 203 and the printing apparatus 201 as described above, and may be, for example, an approximate distance or a value that indicates the distance between the tablet terminal 203 and the printing apparatus 201 in a stepwise manner. For example, the detection unit 20b may obtain the distance from the reception signal intensity of the beacon signal receiving unit 27 by arithmetic processing using an arithmetic equation. Further, the detection unit 20b may convert (change) the reception signal intensity of the beacon signal receiving unit 27 into an approximate distance by using a table that associates the reception signal intensity of the beacon signal receiving unit 27 with a distance. Alternatively, the detection unit 20b may determine the reception signal intensity of the beacon signal receiving unit 27 in a stepwise manner based on a plurality of reference values that have been set in advance and obtain a distance that is set corresponding to a determined step as an approximate distance between the tablet terminal 203 and the printing apparatus 201. The arithmetic equation, the table, the reference values, and the other setting values may be, for example, set in advance and stored in the printing apparatus storage unit 221.

The detection unit 20b outputs the calculated distance (that may be the approximate distance) to the processing unit 20a.

Further, the detection unit 20b may identify positions of the tablet terminal 203 and the printing apparatus 201 by analyzing captured image data obtained by capturing images of an environment (a store and the like) where the POS system 200 is installed, and detect the distance between the tablet terminal 203 and the printing apparatus 201. For example, each of the tablet terminal 203 and the printing apparatus 201 may include a position detection means (not shown in the drawings) that detects a position in an environment where the POS system 200 is installed. In this case, the tablet terminal 203 may transmits data indicating a detected position to the printing apparatus 201 by using the tablet terminal radio communication unit 34, and the printing apparatus 201 may receive the data by using the printing apparatus radio communication unit 22. In this configuration, the detection unit 20b can identify a position of the tablet terminal 203 on the basis of the data received by the printing apparatus radio communication unit 22 and obtain the distance between the tablet terminal 203 and the printing apparatus 201. The invention can be applied to any of these configurations and the other configurations.

The printing apparatus storage unit 221 includes a semiconductor memory element, a magnetic storage apparatus, and the like, and stores a program to be executed by the CPU of the printing apparatus control unit 220 and various data.

The printing apparatus radio communication unit 22, the printing apparatus device connection unit 23, the printing unit 24, and the printing apparatus display unit 25 are the same as those of the first embodiment described above, so that detailed description thereof will be omitted. These units operate under control of the printing apparatus control unit 220.

The cash drawer 4, the barcode scanner 5, and the IC card reader 6 are the same as those of the first embodiment described above, so that detailed description thereof will be omitted. These devices operate under control of the printing apparatus 201 (the printing apparatus control unit 220).

In a usage environment of the POS system 200, the tablet terminal 203 may be used at a position away from the printing apparatus 201. In this case, the cash drawer 4 and the IC card reader 6 are also away from the tablet terminal 203. The cash drawer 4 is an apparatus that stores cash and the IC card reader 6 is an apparatus that performs settlement, so that in a security aspect, it is preferable that visual monitoring or management is performed by a user when these apparatuses are operating. The cash drawer 4 and/or the IC card reader 6 are, so to speak, apparatuses to be monitored by the user.

Therefore, when the distance between the tablet terminal 203 and the printing apparatus 201 is large, in other words, when the tablet terminal 203 is far away from the printing apparatus 201, the POS system 200 shifts to a state in which transmission of a command related to settlement is suppressed. This state is one of the operating states of the printing apparatus 201 and is called a command execution suppression state in the description below. In the command execution suppression state, the printing apparatus 201 suppresses execution of operations based on the open command and the IC card reader control command received from the tablet terminal 203. In other words, in the command execution suppression state, although the printing apparatus 201 can receive the open command and the IC card reader control command transmitted from the tablet terminal 203, the printing apparatus 201 does not execute these commands. Therefore, the cash drawer 4 is not opened, and the IC card reader 6 does not shift to the active state.

The printing apparatus 201 uses a predetermined value as a reference for determining whether or not a condition to shift to the command execution suppression state is established. The predetermined value is a threshold value of the distance between the printing apparatus 201 and the tablet terminal 203. The predetermined value is set in advance and stored in the printing apparatus 201. Specifically, the predetermined value is included in predetermined-value data 21a stored in the printing apparatus storage unit 221.

The predetermined value is set to a value where it becomes difficult for a user who uses the tablet terminal 203 to visually manage an apparatus to be monitored. When an apparatus to be monitored is not under the monitoring of the user or is in a state where it is highly probable that the monitoring becomes difficult, the printing apparatus 201 determines that the condition to shift to the command execution suppression state is established and shifts to the command execution suppression state.

Here, the printing apparatus 201 determines a reception signal intensity when receiving the beacon signal transmitted by the tablet terminal 203 by using the predetermined value as a reference in order to detect the distance between the printing apparatus 201 and the tablet terminal 203. In other words, the printing apparatus 201 shifts to the command execution suppression state on the basis of the reception signal intensity of the beacon signal transmitted by the tablet terminal 203.

The reception signal intensity of the beacon signal approximately reflects the distance between the printing apparatus 201 and the tablet terminal 203, so that it is rational to detect the distance between the printing apparatus 201 and the tablet terminal 203 on the basis of the reception signal intensity of the beacon signal.

The correlation between the reception signal intensity and the distance is not strict and accurate. For example, the reception signal intensity is affected by an environment where the POS system 200 is used. Specifically, the beacon signal may be attenuated by existence of so-called obstacles such as a pillar and a wall. However, the obstacle, which is an element that attenuates the beacon signal, may often an object that interrupts user's visual field. Therefore, these objects may be elements that make it difficult for the user to visually monitor the apparatus to be monitored. Also from this point of view, it is rational to perform determination based on the reception signal intensity of the beacon signal transmitted from the tablet terminal 203 and shift into the command execution suppression state.

Of course, when detecting the distance between the printing apparatus 201 and the tablet terminal 203 by using another method, it is rational to shift into the command execution suppression state when the tablet terminal 203 is far away from the printing apparatus 201 as described above.

As an operating state of the printing apparatus 201, in addition to the command execution suppression state, there is an operating state where the printing apparatus 201 can executes the open command and the IC card reader control command. Such an operating state is called a normal operation state in the description below.

Further, there are commands that can be executed by the printing apparatus 201 in both the normal operation state and the command execution suppression state. The commands whose execution are suppressed by the printing apparatus 201 in the command execution suppression state are part of commands that can be executed by the printing apparatus 201, and are specifically commands related to settlement (more specifically, commands indicating control of a device used for the settlement). These commands whose execution is suppressed can be called, for example, suppression target commands. The open command and the IC card reader control command described above are included in the suppression target commands. Examples of the commands executed by the printing apparatus 201 other than the suppression target commands include a print command, a status request command, a setting command, and a reset command. The print command is a command that causes the printing apparatus 201 to print a receipt R or the like. The status request command is a command that requests the printing apparatus 201 to transmit status information showing an operating state. The setting command is a command for transmitting print setting and operation setting to the printing apparatus 201. The reset command is a command for transmitting an instruction of reset to the printing apparatus 201.

Even in the command execution suppression state, the printing apparatus 201 can receive and execute commands other than the suppression target commands. Of course, in the normal operation state, the printing apparatus 201 can execute commands including the suppression target commands.

Figure 7:
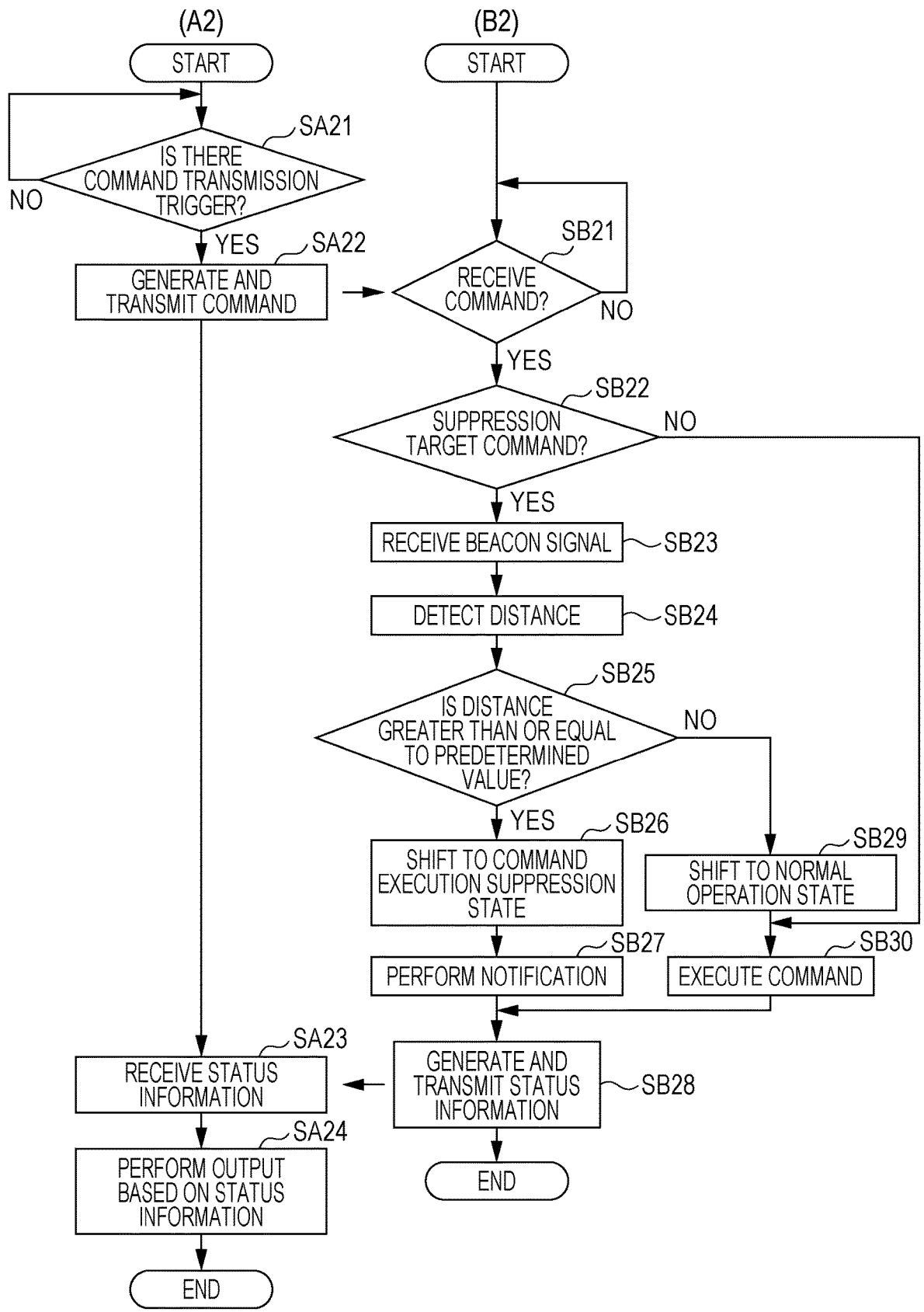
FIG. 7 is a flowchart showing an operation of the POS system.

Hereinafter, operations of the printing apparatus 201 and the tablet terminal 203 of the present embodiment will be described. FIG. 7 is a flowchart showing an operation of the POS system 200. The sign A2 in FIG. 7 indicates an operation flow of the tablet terminal 203 and the sign B2 indicates an operation flow of the printing apparatus 201.

The tablet terminal control unit 230 determines the presence or absence of a trigger for transmitting a command to the printing apparatus 201 (step SA21). The trigger for transmitting a command is detection of a touch operation to the transmission instruction image 76 of the accounting user interface 70 (FIG. 3). Further, reaching the timing of transmitting the open command or the IC card reader control command in the accounting processing described above also corresponds to the trigger. When the trigger for transmitting a command does not occur ((there is no command transmission trigger) step SA21: NO), the tablet terminal control unit 230 waits in step SA21 until the trigger for transmitting a command occurs.

When detecting the trigger for transmitting a command ((there is a command transmission trigger) step SA21: YES), the tablet terminal control unit 230 generates a command corresponding to the trigger and transmits the command from the tablet terminal radio communication unit 34 to the printing apparatus 201 (step SA22).

The processing unit 20a of the printing apparatus control unit 220 determines whether or not the printing apparatus radio communication unit 22 receives a command from the tablet terminal 203 (step SB21). When not receiving a command (step SB21: NO), the processing unit 20a waits in step SB21 until receiving a command.

When receiving a command from the tablet terminal 203 (step SB21: YES), the processing unit 20a determines whether or not a type of the command is a suppression target command (step SB22).

When the processing unit 20a determines that the type of the received command is the suppression target command (step SB22: YES), the processing unit 20a proceeds to step SB23.

The detection unit 20b of the printing apparatus control unit 220 detects that the beacon signal receiving unit 27 receives a beacon signal (step SB23), and detects a distance to the tablet terminal 203 on the basis of a reception signal intensity of the beacon signal in the beacon signal receiving unit 27 (step SB24).

The processing unit 20*a* compares a predetermined value included in the predetermined-value data 21*a* stored in the printing apparatus storage unit 221 with the distance detected by the detection unit 20*b* in step SB24, and determines whether or not the distance detected by the detection unit 20*b* is greater than or equal to the predetermined value (step SB25).

In step SB24, the detection unit 20*b* cannot detect the distance in a state where the beacon signal receiving unit 27 does not receive the beacon signal. Therefore, the printing apparatus control unit 220 waits in step SB23 until the beacon signal receiving unit 27 receives the beacon signal. However, an upper limit may be set to the time for the printing apparatus control unit 220 to wait for receiving the beacon signal in step SB23. The upper limit of the waiting time can be determined by, for example, a setting value stored in the printing apparatus storage unit 221.

In this case, the printing apparatus control unit 220 ends the waiting when the waiting time reaches the upper limit after the printing apparatus control unit 220 determines in step SB22 that the type of the command is the suppression target command. The printing apparatus control unit 220 performs processing of step SB24 by using the reception signal intensity when the beacon signal receiving unit 27 previously received the beacon signal, and detects the distance by using the detection unit 20*b*. Alternatively, the printing apparatus control unit 220 may perform the determination of step SB25 by comparing a distance that was previously detected by the detection unit 20*b* with a predetermined value. The above configuration can be realized by storing the reception signal intensity when the beacon signal receiving unit 27 receives the beacon signal and/or the distance detected by the detection unit 20*b* into the printing apparatus storage unit 221 or the RAM of the printing apparatus storage unit 221. In these cases, it is preferable that the reception signal intensity referred to in step SB24 and the distance referred to in step SB25 are the latest data among the reception signal intensities and the distances in the past. For example, the printing apparatus storage unit 221 or the RAM may store the latest reception signal intensity and the latest distance at all times.

When determining that the distance to the tablet terminal 203 is greater than or equal to the predetermined value (step SB25: YES), the processing unit 20*a* shifts to the command execution suppression state (step SB26). The processing unit 20*a* notifies that the distance to the tablet terminal 203 is greater than or equal to the predetermined value by display of the printing apparatus display unit 25 ((notification execution) step SB27). In this operation, the printing apparatus display unit 25 corresponds a notification unit. When the operating state of the printing apparatus 201 is already the command execution suppression state in step SB26, the processing unit 20*a* maintains the command execution suppression state. Also in this case, it is preferable to perform notification in step SB27. As a notification method in step SB27, for example, the processing unit 20*a* may drive the LED display unit 15 included in the printing apparatus display unit 25 to turn on/off the LEDs in a predetermined manner.

The processing unit 20*a* generates status information showing an execution state or an execution result of a command transmitted by the tablet terminal 203 and transmits the status information to the tablet terminal 203 (step SB28). The status information transmitted in step SB28 may include information indicating that the printing apparatus 201 has shifted into the command execution suppression state or is in the command execution suppression state. The status information may include information indicating that the command transmitted by the tablet terminal 203 in step SA22 is not executed. The status information may include information showing that the command transmitted by the tablet terminal 203 in step SA22 has been normally executed. Further, the status information transmitted in step SB28 may, but need not, include various information such as information showing an operating state of the printing apparatus 201.

On the other hand, when the processing unit 20*a* determines that the distance detected by the detection unit 20*b* is shorter than the predetermined value (step SB25: NO), the processing unit 20*a* shifts to the normal operation state (step SB29). When the operating state of the printing apparatus 201 is already the normal operation state in step SB29, the processing unit 20*a* maintains the normal operation state.

The processing unit 20*a* executes the command received in step SB21 (step SB30). When the command received in step SB22 is a command other than the suppression target commands (step SB22: NO), the processing unit 20*a* proceeds to step SB30 and executes the command.

For example, when receiving the open command in step SB21, the processing unit 20*a* controls the cash drawer 4 on the basis of the open command and brings the cash drawer 4 into the open state in step SB30. Here, the processing unit 20*a* outputs a signal to drive the actuator 43*a* to the cash drawer 4 from, for example, the printing apparatus device connection unit 23 through a serial cable. The processing unit 20*a* may confirm that the cash drawer 4 has shifted to the open state by acquiring an output value of the opening/closing sensor 44 of the cash drawer 4 through the printing apparatus device connection unit 23.

When receiving the IC card reader control command in step SB21, the processing unit 20*a* transmits control data to the IC card reader 6 from the printing apparatus device connection unit 23 in step SB30 and shifts the IC card reader 6 to the active state.

When receiving the print command in step SB21, the processing unit 20*a* performs a printing operation by controlling the printing unit 24 based on the print command in step SB30 and, for example, issues a receipt R.

In addition, the processing unit 20*a* can perform various commands such as the setting command and the status request command in step SB30.

After performing the commands in step SB30, the processing unit 20*a* proceeds to step SB28, generates status information, and transmits the status information to the tablet terminal 203 (step SB28). The status information generated here by the processing unit 20*a* includes information indicating an execution result of a command transmitted by the tablet terminal 203. The status information may include, but need not include, various information such as information indicating that the printing apparatus 201 is in the normal operation state.

The tablet terminal control unit 230 of the tablet terminal 203 receives the status information transmitted by the printing apparatus 201 (step SA23). The tablet terminal control unit 230 performs an output based on the received status information (step SA24). For example, the tablet terminal control unit 230 performs a display based on the status information in the message section 75 of the accounting user interface 70. For example, the tablet terminal control unit 230 displays a message indicating that the cash drawer 4 is unlocked in the message section 75.

In the above operation, when the status information received from the printing apparatus 201 in step SA23 includes information indicating that the printing apparatus 201 has shifted to the command execution suppression state, the tablet terminal 203 may perform a display and/or a notification based on the information. For example, the tablet terminal control unit 230 may perform a display indicating that the printing apparatus 201 is in the command execution suppression state in the message section 75 of the accounting user interface 70. The display may be a message in characters or an image.

As described above, the printing apparatus 201 and a control method of the printing apparatus 201 of the present embodiment include the detection unit 20b that detects the distance to the tablet terminal 203 and the processing unit 20a that performs processing on the basis of a command received from the tablet terminal 203. When the distance to the tablet terminal 203 detected by the detection unit 20b is greater than or equal to a predetermined value, the processing unit 20a limits the execution of processing based on the received command.

According to the printing apparatus 201 and the control method of the printing apparatus 201 to which the invention is applied, when the distance between the printing apparatus 201 and the tablet terminal 203 is greater than or equal to a predetermined value, the printing apparatus 201 can limit execution of a command received from the tablet terminal 203. Thereby, it is possible to cause the printing apparatus 201 to execute a command appropriately. Specifically, when the distance between the printing apparatus 201 and the tablet terminal 203 is greater than or equal to the predetermined value, the printing apparatus 201 shifts to the command execution suppression state where the printing apparatus 201 limits execution of a suppression target command transmitted by the tablet terminal 203. Thereby, it is possible to limit execution of an operation to unlock the cash drawer 4, an operation to shift the IC card reader 6 to the active state, and the like.

The printing apparatus 201 includes the printing apparatus display unit 25, and the processing unit 20a notifies that execution of processing based on a received command is limited by using the printing apparatus display unit 25 when the distance between the printing apparatus 201 and the tablet terminal 203 detected by the detection unit 20b is greater than or equal to the predetermined value. Thereby, the printing apparatus 201 can cause the printing apparatus display unit 25 to notify that the distance between the printing apparatus 201 and the tablet terminal 203 is greater than or equal to the predetermined value and can inform a user who uses the tablet terminal 203 that tablet terminal 203 is far away from the printing apparatus 201.

When the distance between the printing apparatus 201 and the tablet terminal 203 detected by the detection unit 20b is greater than or equal to the predetermined value, the processing unit 20a transmits data (status information) indicating that the execution of processing based on a received command is limited to the tablet terminal 203. Thereby, when the distance between the printing apparatus 201 and the tablet terminal 203 is greater than or equal to the predetermined value, data indicating that the printing apparatus 201 limits the execution of processing based on the command is transmitted to the tablet terminal 203. Therefore, the tablet terminal 203 that transmits a command can detect that the printing apparatus 201 limits the execution of processing based on the command. Thus, it is possible to notify the user who uses the tablet terminal 203 that the execution of processing based on the command is limited.

The processing unit 20a can perform processing according to the type of a command, and the processing unit 20a does not perform processing based on preset types of commands when the distance between the printing apparatus 201 and the tablet terminal 203 detected by the detection unit 20b is greater than or equal to the predetermined value. Thereby, when the tablet terminal 203 is away from the printing apparatus 201, the printing apparatus 201 does not perform processing based on the preset types of commands among the commands that can be executed by the printing apparatus 201. Therefore, the printing apparatus 201 can appropriately execute commands according to the types of the commands.

The printing apparatus 201 can be connected to the cash drawer 4 that is an external apparatus, and when the distance between the printing apparatus 201 and the tablet terminal 203 detected by the detection unit 20b is greater than or equal to the predetermined value, the processing unit 20a does not perform processing based on a command indicating control of the cash drawer 4. Specifically, the processing unit 20a does not executes the open command that unlocks the cash drawer 4. Thereby, in a configuration where an external apparatus is connected to the printing apparatus 201, when the printing apparatus 201 controls the external apparatus on the basis of a command received from the tablet terminal 203, if the distance between the tablet terminal 203 and the printing apparatus 201 is greater than or equal to the predetermined value, the printing apparatus 201 does not perform processing based on the command. Therefore, the printing apparatus 201 can control the external apparatus more appropriately.

In the configuration described above, the external apparatus is the cash drawer 4 and the command transmitted by the tablet terminal 203 is the open command indicating unlock of the cash drawer 4. In this configuration, when the cash drawer 4 is connected to the printing apparatus 201, if the distance between the tablet terminal 203 and the printing apparatus 201 is greater than or equal to the predetermined value, the printing apparatus 201 does not perform processing based on the command indicating unlock of the cash drawer 4. Thereby, it is possible to appropriately control an operation to unlock the cash drawer 4 that stores cash.

The printing apparatus 201 can be connected to the IC card reader 6 that reads data from an IC card. The tablet terminal 203 transmits the IC card reader control command that switches the operating state of the IC card reader 6 to the active state to the printing apparatus 201 as a command for controlling an operation of an external apparatus. The printing apparatus 201 performs control to shift the IC card reader 6 to the active state where the IC card reader 6 can read an IC card on the basis of the IC card reader control command.

In this configuration, when the IC card reader 6 is connected to the printing apparatus 201 and the distance between the tablet terminal 203 and the printing apparatus 201 is greater than or equal to the predetermined value, the printing apparatus 201 does not perform processing based on the command that instructs the IC card reader 6 to start up. Thereby, it is possible to appropriately control an operation to start up the IC card reader 6 and optimize control of the IC card reader 6.

In the embodiment described above, a configuration (step SB24) is described where the detection unit 20b calculates the distance between the tablet terminal 203 and the printing apparatus 201 on the basis of the reception signal intensity of the beacon signal in the beacon signal receiving unit 27. In this configuration, the processing unit 20a determines whether or not to shift to the command execution suppression state by comparing the distance calculated by the detection unit 20b with the predetermined value (step SB25).

The configuration of the invention is not limited to this, and for example, the processing unit 20a may determine whether or not to shift to the command execution suppression state on the basis of the reception signal intensity of the beacon signal receiving unit 27.

Specifically, the detection unit 20b acquires the reception signal intensity of the beacon signal in the beacon signal receiving unit 27. Here, the detection unit 20b may convert the reception signal intensity to values that represent the reception signal intensity in a stepwise manner. For example, the detection unit 20b may determine the reception signal intensity of the beacon signal receiving unit 27 in a stepwise manner on the bases of a plurality of reference values set in advance and output the determined steps.

The processing unit 20a performs an operation to determine whether or not to shift to the command execution suppression state on the basis of the reception signal intensity acquired by the detection unit 20b or the values that represent the reception signal intensity in a stepwise manner. This operation is performed instead of step SB25 (FIG. 7 (flow B2)) described above. In this case, the processing unit 20a may use a predetermined value as a value to determine the reception signal intensity of the beacon signal. The predetermined value may be included in the predetermined-value data 21a as a value different from the predetermined value used to determine the distance between the tablet terminal 203 and the printing apparatus 201. For example, it is possible to determine to shift to the command execution suppression state when the reception signal intensity of the beacon signal in the beacon signal receiving unit 27 is smaller than or equal to a predetermined value.

The printing apparatus 201 includes the beacon signal receiving unit 27 that receives the beacon signal and the processing unit 20a that performs processing on the basis of a command received from the tablet terminal 203. The printing apparatus 201 shifts to the command execution suppression state on the basis of the intensity of the beacon signal received by the beacon signal receiving unit 27 and suppresses execution of processing based on the suppression target commands to be performed by the processing unit 20a. For example, the open command and the IC card reader control command correspond to the commands received from the tablet terminal 203.

According to this configuration, it is possible to limit execution of a command received from the tablet terminal 203 on the basis of the intensity of the beacon signal received by the printing apparatus 201 through the beacon signal receiving unit 27. Thereby, it is possible to suppress execution of a command in a situation where the reception intensity of the beacon signal decreases, such as a case where the tablet terminal 203, which is a transmission source of the beacon signal, is far away from the printing apparatus 201. In this way, it is possible to optimize execution of a command executed by the printing apparatus 201 by limiting execution of the command on the basis of the intensity of the beacon signal, which reflects effects of the position and an installation environment of the tablet terminal 203.

The embodiments described above only show an aspect of the invention and can be arbitrarily modified and applied within the scope of the invention.

For example, in the embodiments described above, as commands indicating control of the printing apparatuses 1 and 201, the open command and the IC card reader control command are described as examples. The invention is not limited to this and, for example, the commands indicating control of the printing apparatuses 1 and 201 may be commands indicating control operation related to the barcode scanner 5. Further, the commands indicating control of the printing apparatuses 1 and 201 may be commands indicating control of the other apparatuses connected to the printing apparatuses 1 and 201. For example, in a configuration where a display apparatus, which displays information, such as a customer display (not shown in the drawings) is connected to the printing apparatuses 1 and 201, the command indicating control of the printing apparatuses 1 and 201 may be a command that causes the printing apparatuses 1 and 201 to perform control to switch on/off of display of the display apparatus. These commands may be included in the suppression target commands described above. In this case, when it is difficult for a user to perform visual monitoring, it is possible to stop or suppress display of information to be performed by the display apparatus. As described above, it is more effective that the commands indicating control of the printing apparatuses 1 and 201 are commands indicating control of an external apparatus connected to the printing apparatuses 1 and 201.

In the first embodiment described above, a configuration is described where the beacon signal transmitting unit 26 transmits the beacon signal and the beacon signal receiving unit 35 receives the beacon signal. Further, a configuration is described where the tablet terminal radio communication unit 34 and the printing apparatus radio communication unit 22 transmit and receive commands such as the open command and the status request command and status information. In the above configurations, the beacon signal transmitting unit 26 and the beacon signal receiving unit 35 can have a configuration suitable for transmitting and receiving the beacon signal. Further, the tablet terminal radio communication unit 34 and the printing apparatus radio communication unit 22 can have a configuration where reception of the beacon signal and the like is not considered, and for example, it is possible to adopt a standard suitable for broadband radio communication. The invention is not limited to this configuration, and for example, the tablet terminal radio communication unit 34 and the printing apparatus radio communication unit 22 may transmit and receive the beacon signal. In this case, there is an advantage that apparatus configuration can be simplified.

In the second embodiment described above, a configuration is described where the beacon signal transmitting unit 36 transmits the beacon signal and the beacon signal receiving unit 27 receives the beacon signal. Further, a configuration is described where the tablet terminal radio communication unit 34 and the printing apparatus radio communication unit 22 transmit and receive commands such as the open command and the status request command and status information. In the above configurations, the beacon signal transmitting unit 36 and the beacon signal receiving unit 27 can have a configuration suitable for transmitting and receiving the beacon signal. Further, the tablet terminal radio communication unit 34 and the printing apparatus radio communication unit 22 can have a configuration where reception of the beacon signal and the like is not considered, and for example, it is possible to adopt a standard suitable for broadband radio communication. The invention is not limited to this configuration, and for example, the tablet terminal radio communication unit 34 and the printing apparatus radio communication unit 22 may transmit and receive the beacon signal. In this case, there is an advantage that apparatus configuration can be simplified.

In the configurations described above, an example is described where the printing apparatuses 1 and 201 are thermal printers including the printing unit 24 having a line thermal head. The invention is not limited to this, and the printing unit 24 may have a configuration of a serial impact dot matrix printer. Further, the printing unit 24 may have a configuration of an ink jet printer or a configuration of a laser printer, and any printing method can be used.

Further, in the configurations described above, a case is illustrated where an external apparatus to which the tablet terminal 3 transmits a command is the printing apparatus 1. However, the invention is not limited to this, and the external apparatus may be an apparatus other than the printing apparatus 1. In other words, the external apparatus may be any apparatus as long as the apparatus is connected with a device such as the cash drawer 4 and the IC card reader 6 and an operating state of the device is switched according to a command transmitted by the tablet terminal 3. Examples of the external apparatus include a computer, an information terminal such as a mobile phone and a smartphone, a server apparatus, and a controller that controls an external device. However, shape, function, performance, and the like of these apparatuses are not limited at all.

The printing apparatus 1 may be mounted in an apparatus having other functions (for example, a combined machine) and realized as part of functions of the apparatus.

Further, in the configurations described above, a case is illustrated where a control apparatus that receives a command from the tablet terminal 203 and performs control (processing) based on the received command is the printing apparatus 201. However, the invention is not limited to this, and the control apparatus may be an apparatus other than the printing apparatus 201. In other words, the control apparatus may be any apparatus as long as the apparatus is connected with a device such as the cash drawer 4 and the IC card reader 6 and an operating state of the device is switched according to a command transmitted by the tablet terminal 203. Examples of the control apparatus include a computer, an information terminal such as a mobile phone and a smartphone, a server apparatus, and a controller that controls an external device. However, shape, function, performance, and the like of these apparatuses are not limited at all.

The printing apparatus 201 may be mounted in an apparatus having other functions (for example, a combined machine) and realized as part of functions of the apparatus.

Further, in the configurations described above, the tablet terminals 3 and 203 are not limited to a tablet type computer, but may be an information terminal such as a smartphone, and the tablet terminals 3 and 203 may have a configuration which can be carried by a user and from which a command can be transmitted.

When the control method of the tablet terminal 3 described above is realized by using a computer included in the tablet terminal 3 or an external apparatus connected to the tablet terminal 3, or the control method of the printing apparatus 201 described above is realized by using a computer included in the printing apparatus 201 or an external apparatus connected to the printing apparatus 201, the invention can be configured in the manners described below. That is, the invention can be implemented by a program executed by a computer to realize the methods or a recording medium that computer-readably stores the program. Alternatively, the invention can be implemented by a transmission medium that transmits the program. As the recording medium, a magnetic recording medium, an optical recording medium, or a semiconductor memory device can be used. Specifically, examples of the recording medium include portable type or fixed type recording media such as a flexible disk, an HDD (Hard Disk Drive), a CD (Compact Disk), a DVD (Digital Versatile Disk), a Blu-ray (registered trademark) Disc, a magneto-optical disk, a flash memory, and a card type recording medium.

Further, the recording medium may be a non-volatile memory apparatus such as RAM, ROM, and HDD that are internal storage apparatuses included in the tablet terminal 3, an external apparatus connected to the tablet terminal 3, the printing apparatus 201, or an external apparatus connected to the printing apparatus 201. The same goes for the printing apparatus 1 or the tablet terminal 203.

For example, each functional block described with reference to the drawings can be realized arbitrarily by hardware and software and does not indicate a specific hardware configuration.

The entire disclosure of Japanese Patent Application No. 2017-23172, filed Feb. 10, 2017 and 2017-23173, filed Feb. 10, 2017 are expressly incorporated by reference herein.

What is claimed is:

1. A terminal apparatus communicatable with a printing apparatus which is connectable to a cash drawer, the terminal apparatus comprising:
   a processor configured to:
      detect a distance to the printing apparatus;
      when the distance to the printing apparatus is greater than or equal to a predetermined value,
      suppress transmission of an open command which instructs the printing apparatus to open the cash drawer;
      when the distance to the printing apparatus is shorter than the predetermined value, transmit the open command, and
      wherein, regardless of whether the distance to the printing apparatus is greater than or equal to the predetermined value, the processor transmits a print command which instructs the printing apparatus to print a receipt, and
      regardless of whether the distance to the printing apparatus is greater than or equal to the predetermined value, the processor transmits a status request command which requests to transmit status information including a state of the cash drawer indicating whether the cash drawer is in an open state or in a closed state.

2. The terminal apparatus according to claim 1, further comprising:
   a display,
   wherein when the distance to the printing apparatus is greater than or equal to the predetermined value, the processor controls the display to display that the distance to the printing apparatus is greater than or equal to the predetermined value.

3. The terminal apparatus according to claim 2, wherein the processor is configured to:
   control the display to display a transmission instruction image to transmit the command according to an operation and
   control the display to display the transmission instruction image as an inoperable manner, when the distance to the printing apparatus is greater than or equal to the predetermined value.

4. The terminal apparatus according to claim 1,
   wherein when the distance to the printing apparatus is greater than or equal to the predetermined value, the processor does not perform processing based on data received from the printing apparatus.

5. The terminal apparatus according to claim 1, further comprising:
a speaker,
wherein when the cash drawer is determined to be in an open state and the distance to the printing apparatus is greater than or equal to the predetermined value, the speaker notifies that the cash drawer is in the open state.

6. A printing apparatus connectable to a cash drawer, the printing apparatus comprising:
a processor configured to:
transmit a radio signal to a terminal apparatus;
receive, from the terminal apparatus, an open command which instructs to open the cash drawer;
when a distance to the terminal apparatus, detected by the terminal apparatus on a basis of the radio signal, is greater than or equal to a predetermined value, not open the cash drawer based on the open command;
when a distance to the terminal apparatus, detected by the terminal apparatus on the basis of the radio signal, is shorter than a predetermined value, open the cash drawer based on the open command;
wherein the processor is configured to:
receive, from the terminal apparatus, a print command which instructs to print a receipt;
regardless of whether the distance to the printing apparatus, detected by the terminal apparatus on the basis of the radio signal, is greater than or equal to the predetermined value, print the receipt based on the print command;
receive, from the terminal apparatus, a status request command which requests to transmit status information including a state of the cash drawer indicating whether the cash drawer is in an open state or in a closed state;
regardless of whether the distance to the printing apparatus, detected by the terminal apparatus on the basis of the radio signal, is greater than or equal to the predetermined value, transmit the status information including the state of the cash drawer.

7. A control method of a terminal apparatus communicatable with a printing apparatus, the printing apparatus being connectable to a cash drawer, the control method comprising:
detecting a distance to the printing apparatus;
when the distance to the printing apparatus is greater than or equal to a predetermined value,
suppressing to transmit an open command which instructs the printing apparatus to open the cash drawer;
when the distance to the printing apparatus is shorter than the predetermined value, transmitting the open command;
wherein, regardless of whether the distance to the printing apparatus is greater than or equal to the predetermined value, transmitting a print command which instructs the printing apparatus to print a receipt, and
regardless of whether the distance to the printing apparatus is greater than or equal to the predetermined value, transmitting a status request command which requests to transmit status information including a state of the cash drawer indicating whether the cash drawer is in an open state or in a closed state.

* * * * *